US006760492B1

(12) United States Patent
Lit et al.

(10) Patent No.: US 6,760,492 B1
(45) Date of Patent: Jul. 6, 2004

(54) NONLINEAR OPTICAL SWITCH

(76) Inventors: John Lit, 139 Briarcliffe Crescent, Waterloo, Ontario (CA), N2L 5T6; Hossam Zoweil, Apartment 5, 516 Quiet Place, Waterloo, Ontario (CA), N2L 5A3

( * ) Notice: Subject to any disclaimer, the term of this patent is extended or adjusted under 35 U.S.C. 154(b) by 199 days.

(21) Appl. No.: 10/173,435

(22) Filed: Jun. 18, 2002

Related U.S. Application Data

(60) Provisional application No. 60/298,923, filed on Jun. 19, 2001.

(51) Int. Cl.[7] ............................................. G02F 1/295
(52) U.S. Cl. ................... 385/5; 385/16; 385/18; 385/24; 385/37
(58) Field of Search ............................ 385/5, 37, 16, 385/18, 24

(56) References Cited

U.S. PATENT DOCUMENTS

| | | | |
|---|---|---|---|
| 5,887,103 A | 3/1999 | Jeong et al. | |
| 5,907,647 A | 5/1999 | Eggleton et al. | |
| 5,915,053 A | 6/1999 | Jeong et al. | |
| 5,937,129 A | 8/1999 | Jeong et al. | |
| 6,002,522 A | * 12/1999 | Todori et al. | 359/573 |
| 6,205,267 B1 | 3/2001 | Aksyuk et al. | |
| 6,414,780 B1 | * 7/2002 | D'Aguanno et al. | 359/241 |
| 6,661,942 B1 | * 12/2003 | Gharavi | 385/16 |
| 2002/0150363 A1 | * 10/2002 | Bonfrate et al. | 385/122 |
| 2003/0068148 A1 | * 4/2003 | Zakharenkov et al. | 385/122 |
| 2003/0207215 A1 | * 11/2003 | Xu et al. | 430/321 |

* cited by examiner

*Primary Examiner*—Thien M. Le
*Assistant Examiner*—Allyson N. Trail

(57) ABSTRACT

The invention provides an optical switch for operation by an incident light. The optical switch has a linear grating portion having an average linear refractive index and a nonlinear grating portion, meeting at an interface. The nonlinear grating portion includes a plurality of periodically alternating layers of nonlinear materials having different refractive indices. The linear grating portion and the nonlinear grating portion are positioned to form a continuous sequence of alternating high and low refractive indices at low intensities. The incident light is substantially reflected at low intensities. At high intensities, a continuous sequence of alternating high and low refractive indices is formed, interrupted by a discontinuity at the interface, and the nonlinear grating portion has a second average nonlinear refractive index which is substantially equivalent to the average linear refractive index. Light having a narrow band of frequencies is substantially transmitted at high intensities.

7 Claims, 20 Drawing Sheets

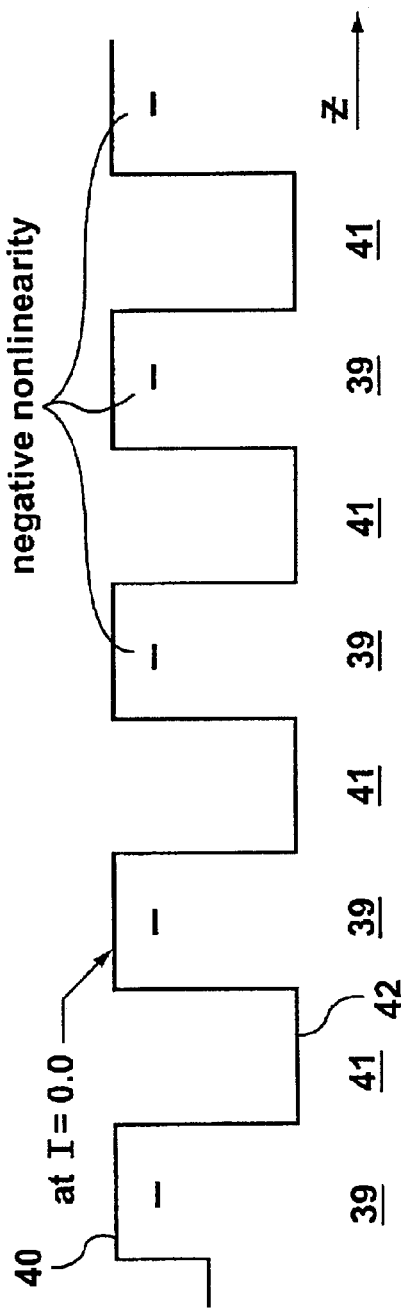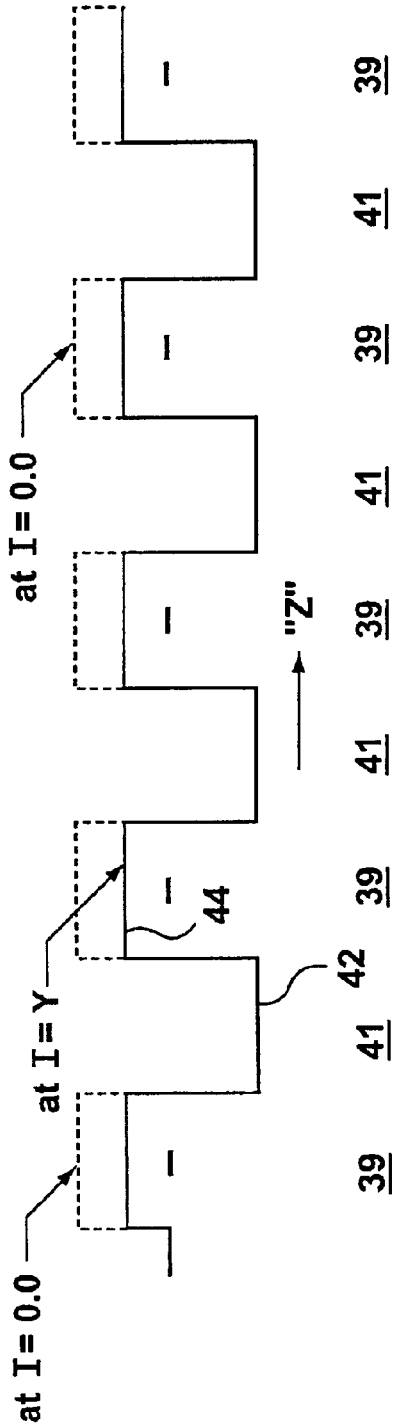
FIG. 1 (Prior Art)
FIG. 2 (Prior Art)

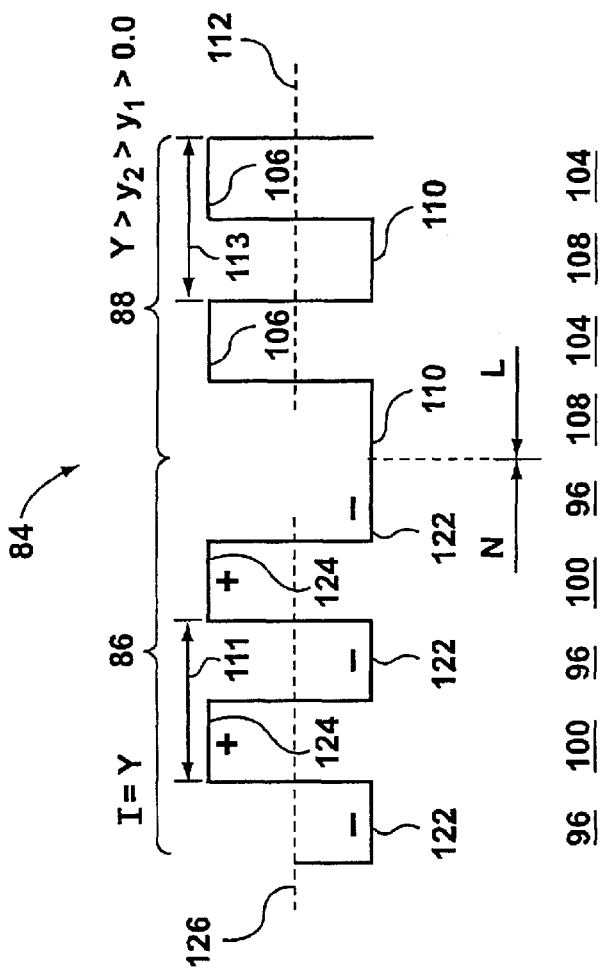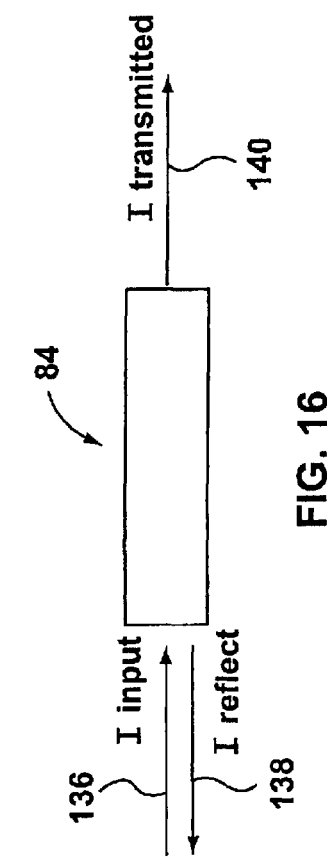

NONLINEAR OPTICAL SWITCH

This application claims benefit of Ser. No. 60/298,923 filed Jun. 19, 2001.

FIELD OF THE INVENTION

This invention is related to the field of optical switches and, in particular, to an optical switch containing nonlinear material.

BACKGROUND OF THE INVENTION

Optical switches are known, however, the known optical switches generally do not have the desired degree of flexibility or do not have sufficient capacity for the uses to which optical systems designers would wish to put them.

For example, as will be described, U.S. Pat. No. 5,740,287 (Scalora et al.) represents an attempt to address some of the shortcomings of the known optical switches by including layers of nonlinear dielectric material in an optical waveguide. Scalora et al. discloses an optical switch in a one-dimensional multilayer dielectric stack in which at least every other layer of the stack is composed of a nonlinear dielectric material. The other layers are linear dielectric material. A transmission function for the stack disclosed by Scalora includes a photonic band gap, and a result of the structure of the stack is that the location and size of the photonic band gap varies with variations in the intensity of the incident light. However, in order for the stack to function, it should be designed for light having a frequency in the photonic band gap which is very near to the low intensity photonic band edge. Practical applications for the stack disclosed by Scalora therefore can be somewhat limited.

There is a continuing need for an optical switch which will have the necessary flexibility and capacity.

SUMMARY OF THE INVENTION

In one of its aspects, the invention provides an optical switch for operation by an incident light. The optical switch has a nonlinear grating portion and a linear grating portion. The nonlinear grating portion including a plurality of periodically alternating layers of a negative nonlinear material having a first nonlinear refractive index and a positive nonlinear material having a second nonlinear refractive index when the incident light has a first intensity, the first nonlinear refractive index being higher than the second nonlinear refractive index. The nonlinear grating portion has a first average nonlinear refractive index when the incident light has the first intensity, and the periodically alternating layers form a first nonlinear grating portion sequence of alternating relatively higher and relatively lower refractive indices when the incident light has the first intensity. In addition, the nonlinear grating portion has a nonlinear grating period. The linear grating portion is positioned adjacent to the nonlinear grating portion, and the linear grating portion and the nonlinear grating portion meet at an interface. The linear grating portion includes a plurality of periodically alternating layers of a first linear material having a first linear refractive index and a second linear material having a second linear refractive index, the first linear refractive index being higher than the second linear refractive index. The periodically alternating layers comprising the linear grating portion form a linear grating portion sequence of alternating relatively higher and relatively lower refractive indices. Also, the linear grating portion has an average linear refractive index which is substantially equivalent to the first average nonlinear refractive index, and the linear grating portion has a linear grating portion period which is substantially equivalent to the nonlinear grating portion period. The nonlinear grating portion and the linear grating portion are positioned relative to each other so that the first nonlinear grating portion sequence and the linear grating portion sequence form a continuous sequence of alternating relatively higher and relatively lower refractive indices along the optical switch, and in these circumstances, the incident light having the first intensity is substantially reflected. When the incident light has a second intensity, the negative nonlinear material has a third nonlinear refractive index and the positive nonlinear material has a fourth nonlinear refractive index. The second intensity is substantially higher than the first intensity. Also, the fourth nonlinear refractive index is substantially higher than the third nonlinear refractive index, so that the periodically alternating layers comprising the nonlinear grating portion form a second nonlinear grating portion sequence of alternating relatively higher and relatively lower refractive indices when the incident light has the second intensity. The second nonlinear grating portion sequence and the linear grating portion sequence form a continuous sequence of alternating relatively higher and relatively lower refractive indices along the optical switch, interrupted by a discontinuity at the interface of the linear grating portion and the nonlinear grating portion, so that, when the incident light has the second intensity, the nonlinear grating portion has a second average nonlinear refractive index which is substantially equivalent to the average linear refractive index, and light having a narrow band of frequencies is substantially transmitted. In the result, when the incident light has the first intensity, the incident light is substantially reflected by the optical switch, and when the incident light has the second intensity, light having a narrow band of frequencies is substantially transmitted by the optical switch. In effect, when the incident light has the second intensity, the optical switch responds like a grating having a phase shift of $\pi$ between the linear grating portion and the nonlinear grating portion, and the optical switch transmits a narrow band of frequencies that are reflected at low intensities.

In another aspect, the invention provides an optical switch for operation by an incident light, the optical switch having a nonlinear grating portion, a linear grating portion, and a phase shift portion disposed between the nonlinear grating portion and the linear grating period. The nonlinear grating portion includes a plurality of periodically alternating layers of a negative nonlinear material having a first nonlinear refractive index and a positive nonlinear material having a second nonlinear refractive index when the incident light has a first intensity, the first nonlinear refractive index being higher than the second nonlinear refractive index. The nonlinear grating portion has a first average nonlinear refractive index when the incident light has the first intensity. In addition, the periodically alternating layers form a first nonlinear grating portion sequence of alternating relatively higher and relatively lower refractive indices. The nonlinear grating portion has a nonlinear grating portion period. The linear grating portion includes a plurality of periodically alternating layers of a first linear material having a first linear refractive index and a second linear material having a second linear refractive index, the first linear refractive index being higher than the second linear refractive index. The periodically alternating layers comprising the linear grating portion form a linear grating portion sequence of alternating relatively higher and relatively lower refractive indices. The linear grating portion has an average linear refractive index. The linear grating portion also has a linear grating portion period which is substantially equivalent to the nonlinear grating portion period. The nonlinear grating portion and the linear grating portion are positioned relative to each other so that the first nonlinear grating portion sequence and the linear grating portion sequence form a continuous sequence of alternating relatively higher and relatively lower refractive indices along the optical switch, interrupted by a first discontinuity at the phase shift portion. The first average nonlinear refractive index is substantially equivalent to the average linear refractive index, and when incident light has the first intensity, light having a first narrow band of frequencies is transmitted. When the incident light has a second intensity, the negative nonlinear material has a third nonlinear refractive index and the positive nonlinear material has a fourth nonlinear refractive index. The second intensity is substantially higher than the first intensity. Also, the fourth nonlinear refractive index is substantially higher than the third nonlinear refractive index, so that the periodically alternating layers comprising the nonlinear grating portion form a second nonlinear grating portion sequence of alternating relatively higher and relatively lower refractive indices when the incident light has the second intensity. The second nonlinear grating portion sequence and the linear grating portion sequence form a continuous sequence of alternating relatively higher and relatively lower refractive indices along the optical switch, interrupted by a second discontinuity at the phase shift portion, the second discontinuity differing substantially from the first discontinuity, so that, when the incident light has the second intensity, the nonlinear grating portion has a second average nonlinear refractive index which is substantially equivalent to the average linear refractive index, and light having at least one second narrow band of frequencies is transmitted by the optical switch. In the result, when the incident light has the first intensity, light having the first narrow band of frequencies is substantially transmitted by the optical switch, and when the incident light has the second intensity, light having the second narrow band of frequencies is substantially transmitted by the optical switch.

In accordance with another aspect of the present invention, there is provided an optical switch for operation by an incident light which includes a nonlinear grating portion, a linear grating portion, and a phase shift portion disposed between the nonlinear grating portion and the linear grating portion. The nonlinear grating portion includes a plurality of periodically alternating layers of a first negative nonlinear material having a first nonlinear refractive index and a second negative nonlinear material having a second nonlinear refractive index when the incident light has a first intensity, the first nonlinear refractive index being higher than the second nonlinear refractive index. The nonlinear grating portion has a first average nonlinear refractive index when the incident light has the first intensity. Also, the periodically alternating layers form a first nonlinear grating portion sequence of alternating relatively higher and relatively lower refractive indices. The nonlinear grating portion has a nonlinear grating portion period. The linear grating portion includes a plurality of periodically alternating layers of a first linear material having a first linear refractive index and a second linear material having a second linear refractive index, the first linear refractive index being higher than the second linear refractive index. The periodically alternating layers comprising the linear grating portion form a linear grating portion sequence of alternating relatively higher and relatively lower refractive indices. The linear grating portion also has an average linear refractive index. In addition, the linear grating portion has a linear grating portion period substantially equivalent to the nonlinear grating portion period. The nonlinear grating portion and the linear grating portion are positioned relative to each other so that the first nonlinear grating portion sequence and the linear grating portion sequence form a continuous sequence of alternating relatively higher and relatively lower refractive indices along the optical switch, interrupted by a discontinuity at the phase shift portion. The first average nonlinear refractive index differs substantially from the average linear refractive index when the incident light has the first intensity, so that incident light having the first intensity is substantially reflected. When the incident light has a second intensity, the first negative nonlinear material has a third nonlinear refractive index and the second negative nonlinear material has a fourth nonlinear refractive index when the incident light has a second intensity. The second intensity is substantially higher than the first intensity. The fourth nonlinear refractive index is substantially higher than the third nonlinear refractive index, so that the periodically alternating layers comprising the nonlinear grating portion form a second nonlinear grating portion sequence of alternating relatively higher and relatively lower refractive indices when the incident light has the second intensity. The second nonlinear grating portion sequence and the linear grating portion sequence form a continuous sequence of alternating relatively higher and relatively lower refractive indices along the optical switch, interrupted by the discontinuity at the phase shift portion, so that, when the incident light has the second intensity, the nonlinear grating portion has a second average nonlinear refractive index which is substantially equivalent to the average linear refractive index, and light having at least one narrow band of frequencies is substantially transmitted. In this embodiment, when the incident light has the first intensity, the incident light is substantially reflected by the optical switch, and when the incident light has the second intensity, light having at least one narrow band of frequencies is substantially transmitted by the optical switch.

In another alternative embodiment, the optical switch for operation by an incident light comprises a nonlinear grating portion, a linear grating portion, and a phase shift portion disposed between the nonlinear grating portion and the linear grating portion. The nonlinear grating portion includes a plurality of periodically alternating layers of a first positive nonlinear material having a first nonlinear refractive index and a second positive nonlinear material having a second nonlinear refractive index when the incident light has a first intensity, the first nonlinear refractive index being higher than the second nonlinear refractive index. The nonlinear grating portion has a first average nonlinear refractive index when the incident light has the first intensity. Also, the periodically alternating layers form a first nonlinear grating portion sequence of alternating relatively higher and relatively lower refractive indices. The nonlinear grating portion has a nonlinear grating portion period. The linear grating portion includes a plurality of periodically alternating layers of a first linear material having a first linear refractive index and a second linear material having a second linear refractive index, the first linear refractive index being higher than the second linear refractive index. The periodically alternating layers comprising the linear grating portion form a linear grating portion sequence of alternating relatively higher and relatively lower refractive indices. The linear grating portion also has an average linear refractive index. The linear grating portion has a linear grating portion period which is substantially equivalent to the nonlinear grating portion period. The nonlinear grating portion and the linear grating portion are positioned relative to each other so that the first nonlinear grating portion sequence and the linear grating portion sequence form a continuous sequence of alternating relatively higher and relatively lower refractive indices along the optical switch, interrupted by a discontinuity at the phase shift portion. Also, the nonlinear grating portion has a first average nonlinear refractive index which differs substantially from the average linear refractive index when the incident light has the first intensity, so that incident light having the first intensity is substantially reflected by the optical switch. The first positive nonlinear material has a third nonlinear refractive index and the second positive nonlinear material has a fourth nonlinear refractive index when the incident light has a second intensity, the second intensity being substantially higher than the first intensity. The fourth nonlinear refractive index is substantially higher than the third nonlinear refractive index, so that the periodically alternating layers comprising the nonlinear grating portion form a second nonlinear grating portion sequence of alternating relatively higher and relatively lower refractive indices when the incident light has the second intensity. The second nonlinear grating portion sequence and the linear grating portion sequence form a continuous sequence of alternating relatively higher and relatively lower refractive indices along the optical switch, interrupted by the discontinuity at the phase shift portion, so that, when the incident light has the second intensity, the nonlinear grating portion has a second average nonlinear refractive index which is substantially equivalent to the average linear refractive index, and light having at least one narrow band of frequencies is transmitted. In this embodiment, when the incident light has the first intensity, the incident light is substantially reflected by the optical switch, and when the incident light has the second intensity, light having at least one narrow band of frequencies is substantially transmitted by the optical switch.

In yet another of its aspects, the present invention provides an optical switch for operation by an incident light. The optical switch includes a nonlinear grating portion, a linear grating portion, and a phase shift portion disposed between the nonlinear grating portion and the linear grating portion. The nonlinear grating portion includes a plurality of periodically alternating layers of a first positive nonlinear material having a first nonlinear refractive index and a second positive nonlinear material having a second nonlinear refractive index when the incident light has a first intensity, the first nonlinear refractive index being higher than the second nonlinear refractive index. The nonlinear grating portion has a first average nonlinear refractive index $n_1$ when the incident light has the first intensity. The periodically alternating layers form a first nonlinear grating portion sequence of alternating relatively higher and relatively lower refractive indices. Also, the nonlinear grating portion has a nonlinear grating portion period $P_2$. The linear grating portion includes a plurality of periodically alternating layers of a first linear material having a first linear refractive index and a second linear material having a second linear refractive index, the first linear refractive index being higher than the second linear refractive index. The periodically alternating layers comprising the linear grating portion form a linear grating portion sequence of alternating relatively higher and relatively lower refractive indices. In addition, the linear grating portion has an average linear refractive index $n_0$. The linear grating portion also has a linear grating portion period $P_1$ which is substantially greater than the nonlinear grating portion period $P_2$. The nonlinear grating portion and the linear grating portion are positioned relative to each other so that the first nonlinear grating portion sequence and the linear grating portion sequence form a continuous sequence of alternating relatively higher and relatively lower refractive indices along the optical switch, interrupted by a discontinuity at the phase shift portion. When the incident light has a second intensity, the first positive nonlinear material has a third nonlinear refractive index and the second positive nonlinear material has a fourth nonlinear refractive index. The second intensity is substantially higher than the first intensity. The fourth nonlinear refractive index is substantially higher than the third nonlinear refractive index, so that the periodically alternating layers comprising the nonlinear grating portion form a second nonlinear grating portion sequence of alternating relatively higher and relatively lower refractive indices when the incident light has the second intensity. The second nonlinear grating portion sequence and the linear grating portion sequence form a continuous sequence of alternating relatively higher and relatively lower refractive indices along the optical switch, interrupted by the discontinuity at the phase shift portion. The nonlinear grating portion has a second average nonlinear grating refractive index $n_2$ when the incident light has the second intensity, so that the following equation:

$$2n_0P_1 = 2n_2P_2$$

is satisfied, and light having at least one narrow band of frequencies is transmitted. Also, $2n_0P_1$ differs substantially from $2n_1P_2$, so that the incident light having the first intensity is substantially reflected. In the result, when the incident light has the first intensity, the incident light is substantially reflected by the optical switch, and when the incident light has the second intensity, light having at least one narrow band of frequencies is substantially transmitted by the optical switch.

In yet another of its aspects, the invention provides an optical switch for operation by an incident light. The optical switch has a nonlinear grating portion, a linear grating portion, and a phase shift portion disposed between the nonlinear grating portion and the linear grating portion. The nonlinear grating portion includes a plurality of periodically alternating layers of a first negative nonlinear material having a first nonlinear refractive index and a second negative nonlinear material having a second nonlinear refractive index when the incident light has a first intensity, the first nonlinear refractive index being higher than the second nonlinear refractive index. The nonlinear grating portion has a first average refractive index $n_1$ when the incident light has the first intensity. Also, the periodically alternating layers form a first nonlinear grating portion sequence of alternating relatively higher and relatively lower refractive indices, and the nonlinear grating portion has a nonlinear grating portion period $P_2$. The linear grating portion includes a plurality of periodically alternating layers of a first linear material having a first linear refractive index and a second linear material having a second linear refractive index, the first linear refractive index being higher than the second linear refractive index. The periodically alternating layers comprising the linear grating portion form a linear grating portion sequence of alternating relatively higher and relatively lower refractive indices. The linear grating portion also has an average linear refractive index $n_0$. In addition, the linear grating portion has a linear grating portion period $P_1$ which is substantially less than the nonlinear grating portion period $P_2$. The nonlinear grating portion and the linear grating portion are positioned relative to each other so that the first nonlinear grating portion sequence and the linear grating portion sequence form a continuous sequence of alternating relatively higher and relatively lower refractive indices along the optical switch, interrupted by a discontinuity at the phase shift portion. When the incident light has a second intensity, the first negative nonlinear material has a third nonlinear refractive index and the second negative nonlinear material has a fourth nonlinear refractive index. The second intensity is substantially higher than the first intensity. The fourth nonlinear refractive index is substantially higher than the third nonlinear refractive index, so that the periodically alternating layers comprising the nonlinear grating portion form a second nonlinear grating portion sequence of alternating relatively higher and relatively lower refractive indices when the incident light has the second intensity. The second nonlinear grating portion sequence and the linear grating portion sequence form a continuous sequence of alternating relatively higher and relatively lower refractive indices along the optical switch, interrupted by the discontinuity of the phase shift portion. The nonlinear grating portion has a second average nonlinear refractive index $n_2$ when the incident light has the second intensity, so that the following equation:

$$2n_0P_1=2n_2P_2$$

is satisfied, and light having at least one narrow band of frequencies is substantially transmitted. In addition, $2n_0P_1$ differs substantially from $2n_1P_2$, so that the incident light having the first intensity is substantially reflected. In this embodiment, when the incident light has the first intensity, the incident light is substantially reflected by the optical switch, and when the incident light has the second intensity, light having at least one narrow band of frequencies is substantially transmitted by the optical switch.

In yet another of its aspects, the present invention provides any of the described embodiments of the optical switch in which the optical switch additionally includes a gain medium for amplifying the incident light and a means for exciting the gain medium, so that when the incident light is supplied to the gain medium and the gain medium is excited; the gain medium amplifies the incident light.

BRIEF DESCRIPTION OF THE DRAWINGS

The invention will be better understood with reference to the attached drawings, in which:

FIG. 1 is a schematic representation of the refractive indices of layers of a first version of a multilayer dielectric stack of the prior art when an incident light has a relatively low intensity;

FIG. 2 is a schematic representation of the refractive indices of layers of the first version of the multilayer dielectric stack of the prior art when the incident light has a relatively high intensity;

FIG. 13 is a schematic representation of the optical switch of FIG. 10 in which the incident light has a high intensity y, y being greater than $y_2$;

FIG. 16 is a drawing showing a preferred embodiment of the optical switch;

DETAILED DESCRIPTION OF THE PREFERRED EMBODIMENT(S)

Figure 4:
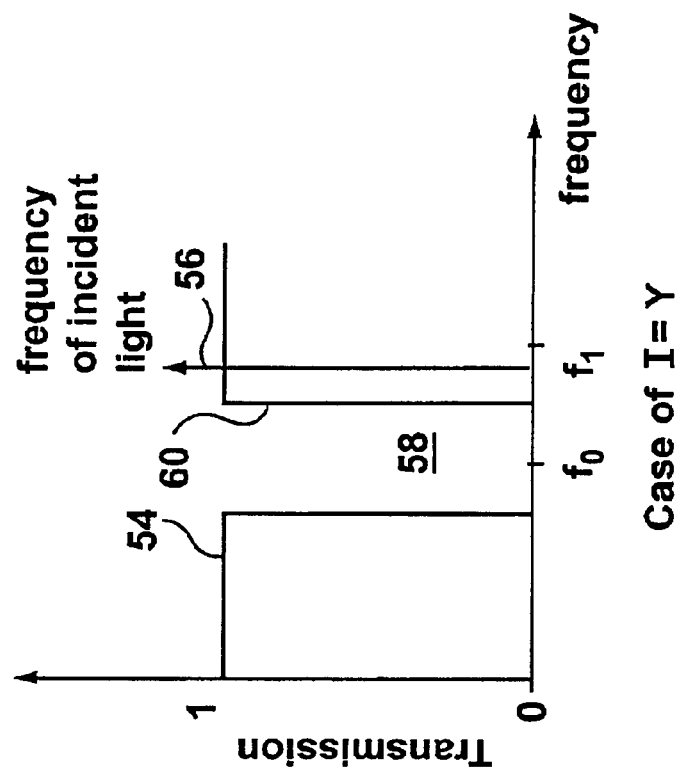
FIG. 4 is an approximate graphic illustration of the transmission function for the multilayer dielectric stack of FIG. 2.

In order to better understand the invention, certain prior art will now be discussed.

As noted above, U.S. Pat. No. 5,740,287 discloses an optical switch in a one-dimensional multilayer dielectric stack in which at least every other layer of the stack is composed of a nonlinear dielectric material. The invention disclosed in Scalora et al. is schematically represented in FIGS. 1–2 and 5–6. In FIG. 1, an optical waveguide is schematically represented in which layers of a negative nonlinear material 39 having a relatively higher refractive index 40 alternate with layers of a linear material 41 having a relatively lower refractive index 42. In FIG. 1, the intensity of the incident light (having a frequency $f_1$) is zero, or close to zero.

As can be seen in FIG. 2, because the material 39 having the relatively higher refractive index 40 is negative nonlinear material, an increase in the intensity (I) of the incident light having a frequency $f_1$ to a value y, y being greater than zero, causes the relatively higher refractive index 40 to decrease to a second relatively higher refractive index 44.

Figure 3:
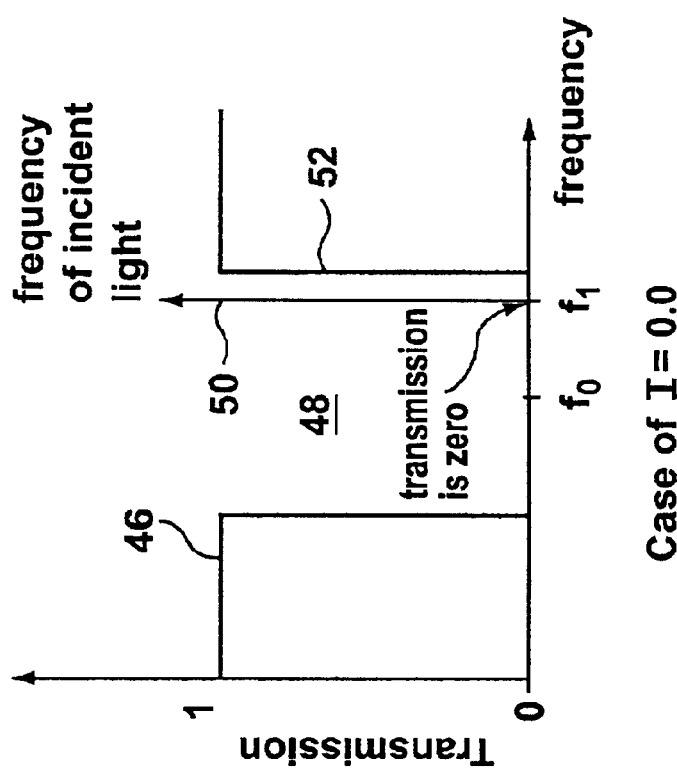
FIG. 3 is an approximate graphic illustration of the transmission function for the multilayer dielectric stack of FIG. 1.

FIG. 3 shows an approximation of a transmission function 46 of the device schematically represented in FIG. 1. The transmission function 46 includes a reflection gap 48. As can be seen in FIG. 3, when the frequency of an incident light 50 is $f_1$, the incident light 50 is within the reflection gap 48, and in the vicinity of a margin 52 of the reflection gap 48. It can be seen in FIG. 3, therefore, that where the intensity of the incident light 50 is zero or close to zero, substantially all of the incident light 50 is reflected by the device schematically represented in FIG. 1.

FIG. 4 shows an approximation of a transmission function 54 of the device as schematically represented in FIG. 2, i.e., where the intensity of an incident light 56 is y, y being a relatively high intensity. As can be seen in FIG. 4, the transmission function 54 includes a reflection gap 58 which is narrower than the reflection gap 48 shown in FIG. 3. A margin 60 of the reflection gap 58 is, in FIG. 4, disposed to the left of the incident light 56. In other words, in FIG. 4, the incident light 56 is clearly not in the reflection gap 58. As FIG. 4 shows, the incident light 56, having a frequency $f_1$ and a relatively high intensity y, is transmitted by the device.

As can be seen from FIGS. 1–4, the effect of the decrease in the relatively higher refractive index of the negative nonlinear material 39 when the intensity of the incident light increases (as shown in FIG. 2) is to decrease the reflection gap in the transmission function (as shown in FIGS. 3 and 4).

The prior art device schematically represented in FIGS. 1–2 therefore can be used as an optical switch in which the switching function is controlled by the intensity of the incident light However, it will be evident from the foregoing description that this prior art device is useful only where, when the intensity of the light is zero or close to zero, the transmission function is such that the incident light is positioned inside the reflection gap, but very close to a margin of the reflection gap. In order for this prior art device to function, the refractive indices of the alternating negative nonlinear material 39 and the linear material 41 have to be such that, when the incident light has a high intensity y, the reflection gap will narrow sufficiently that the incident light will be transmitted.

Figure 5:
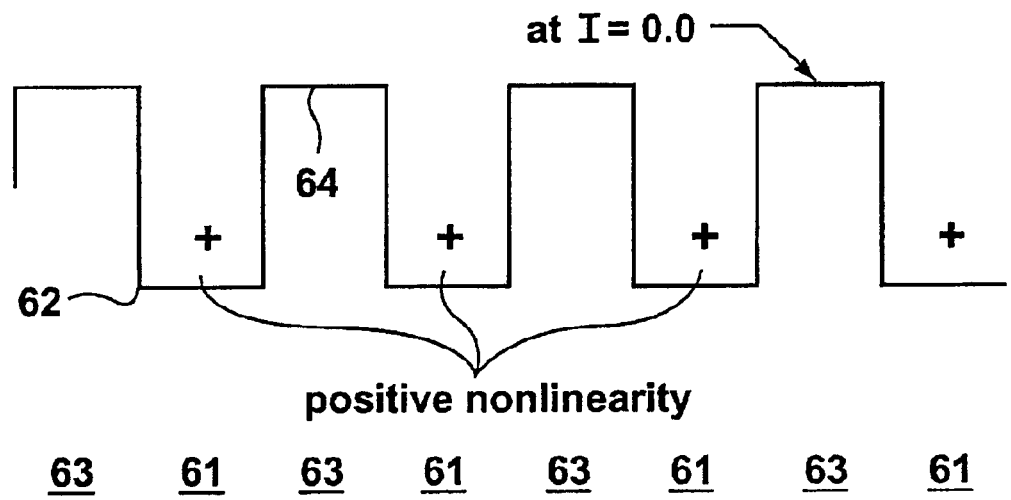
FIG. 5 is a schematic representation of the refractive indices of a second version of the multilayer dielectric stack of the prior art when the incident light has a relatively low intensity.
Figure 6:
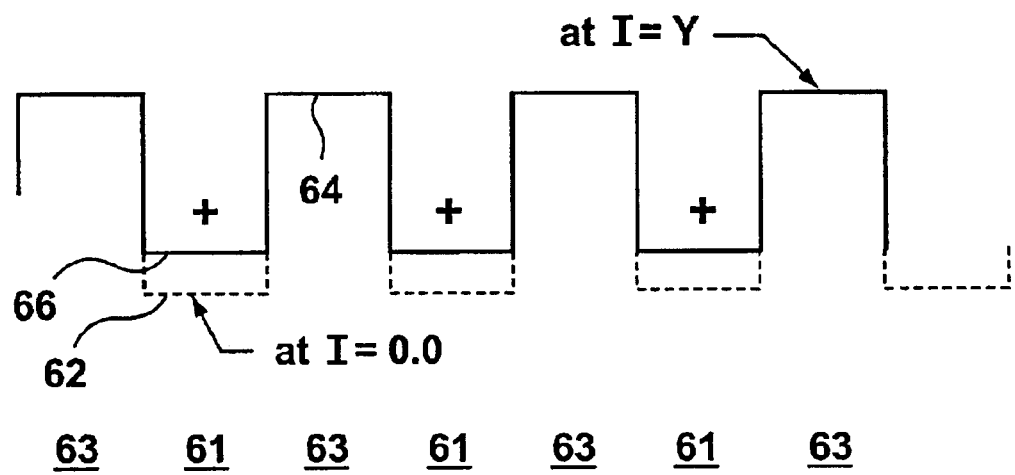
FIG. 6 is a schematic representation of the refractive indices of the second version of the multilayer dielectric stack of the prior art when the incident light has a relatively high intensity.

A second prior art device, also disclosed in Scalora et al., is schematically represented in FIGS. 5 and 6. In this second device, as can be seen in FIG. 5, layers of a positive nonlinear material 61 having a relatively lower refractive index 62 alternate with layers of a linear material 63 having a relatively higher refractive index 64. FIG. 5 represents the device when the incident light having a frequency $f_1$, is zero, or close to zero. As can be seen in FIG. 6, the positive nonlinear material 61 has a second relatively higher refractive index 66 when the incident light (having frequency $f_1$) has a higher intensity y.

Figure 7:
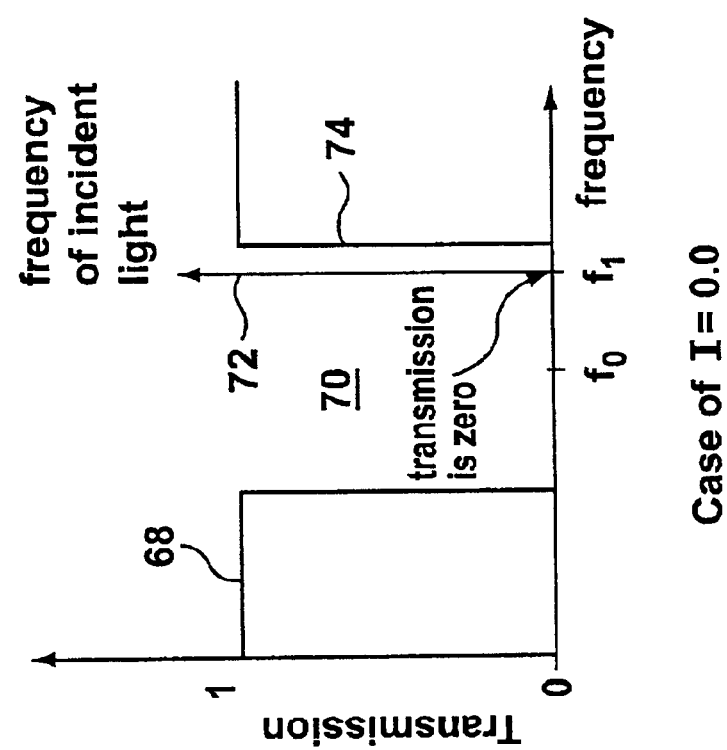
FIG. 7 is an approximate graphic illustration of the transmission function for the multilayer dielectric stack of FIG. 5.

FIG. 7 shows an approximation of a transmission function 68 of the device schematically represented in FIG. 5. The transmission function 68 includes a reflection gap 70. As can be seen in FIG. 7, when the frequency of an incident light 72 is $f_1$, the incident light 72 is within the reflection gap 70, and in the vicinity of a margin 74 of the reflection gap 70. It can therefore be seen in FIG. 7 that, where the intensity of the incident light 72 is low, substantially all of the incident light 72 is reflected by the device schematically represented in FIG. 5.

Figure 8:
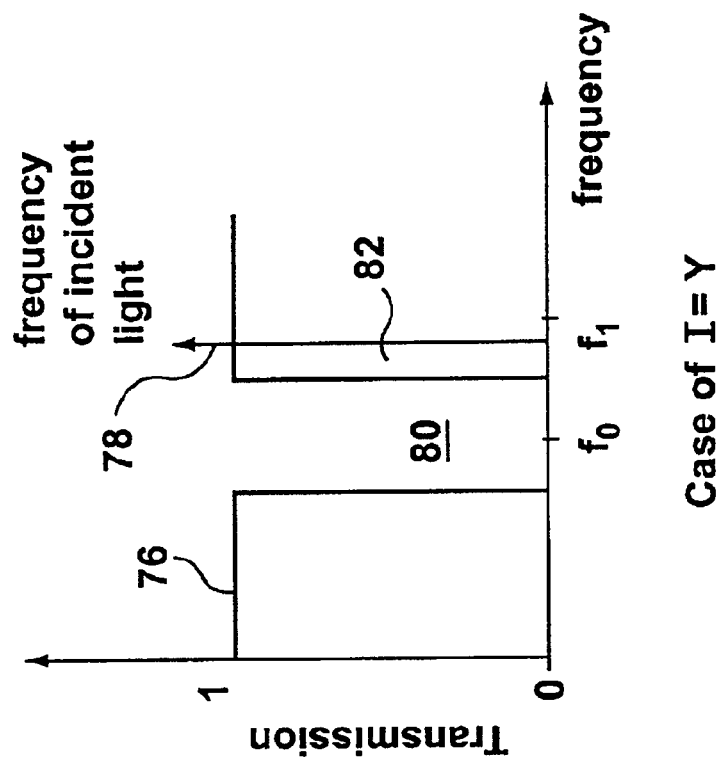
FIG. 8 is an approximate graphic illustration of the transmission function for the multilayer dielectric stack of FIG. 6.

FIG. 8 shows an approximation of a transmission function 76 of the device as schematically represented in FIG. 6, i.e., where the intensity of an incident light 78 is y, y being a relatively high intensity. As can be seen in FIG. 8, the transmission function 76 includes a reflection gap 80 which is narrower than the reflection gap 70 shown in FIG. 7. A margin 82 of the reflection gap 80 is, in FIG. 8, disposed to the left of the incident light 78. In other words, in FIG. 8, the incident light 78 is clearly not in the reflection gap 80. As FIG. 8 shows, the incident light 78, having a frequency $f_1$ and a relatively high intensity y, is transmitted by the device.

As can be seen from FIGS. 5–8, the effect of the increase in the relatively lower refractive index of the positive nonlinear material 61 when the intensity of the incident light increases (as shown in FIG. 6) is to decrease the reflection gap in the transmission function (as shown in FIGS. 7 and 8).

Similarly to the prior art device schematically represented in FIGS. 1–2, the prior art device schematically represented in FIGS. 5–6 therefore can be used as an optical switch in which the switching function is controlled by the intensity of the incident light. Once again, however, the prior art device schematically represented in FIGS. 5–6 is useful only where, when the intensity of the light is low, the transmission function is such that the incident light is positioned inside the reflection gap, but very close to a margin of the reflection gap. Similarly to the prior art device schematically represented in FIGS. 1–2, in order for the prior art device schematically represented in FIGS. 5–6 to function, the refractive indices of the alternating positive nonlinear material 61 and the linear material 63 have to be such that, when the incident light has a high intensity y, the reflection gap will narrow sufficiently that the incident light will be transmitted.

The second prior art device, schematically represented in FIGS. 5–6, simply shows that a positive nonlinear material may be substituted for the negative nonlinear material of the first prior art device schematically represented in FIGS. 1–2, and a similar transmission function will result. The second prior art device might be useful, for example, where the designer of an optical device for incident light with a certain frequency f may be unable to find a negative nonlinear material which will achieve the desired result, i.e., reflection when the incident light having a frequency f has a relatively low intensity, and transmission when the incident light has a high intensity. The designer may find that a positive nonlinear material is available which will enable the device to achieve the desired result for incident light with a particular frequency or range of frequencies.

From the foregoing, it can be seen that the invention disclosed by the Scalora et al. patent provides only very limited flexibility. Also, the structure of the invention disclosed by the Scalora et al. patent requires that layers of nonlinear material (positive or negative) alternate with layers of linear material. As will be described, the optical switch of the invention provides substantially more flexibility, and has greater capacity.

Figure 9:
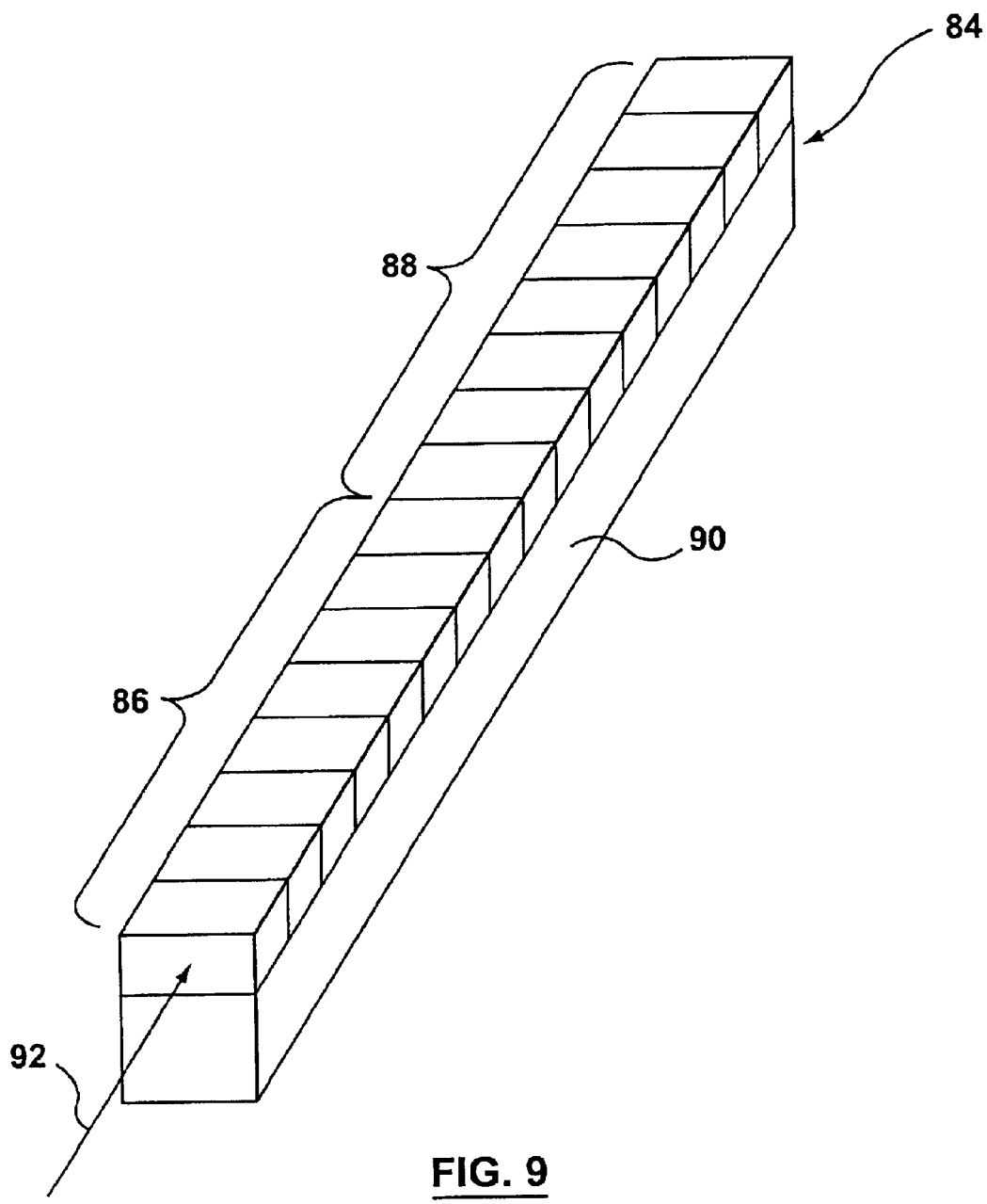
FIG. 9 is an isometric view of a preferred embodiment of the optical switch.

Reference is made to FIG. 9 to describe a preferred embodiment of an optical switch indicated generally by the numeral 84 in accordance with the invention. The optical switch has a linear grating portion 86 and a nonlinear grating portion 88 disposed on a substrate 90. As will be described, in use, an incident light represented by arrow 92 is directed into the optical switch 84.

Figure 10:
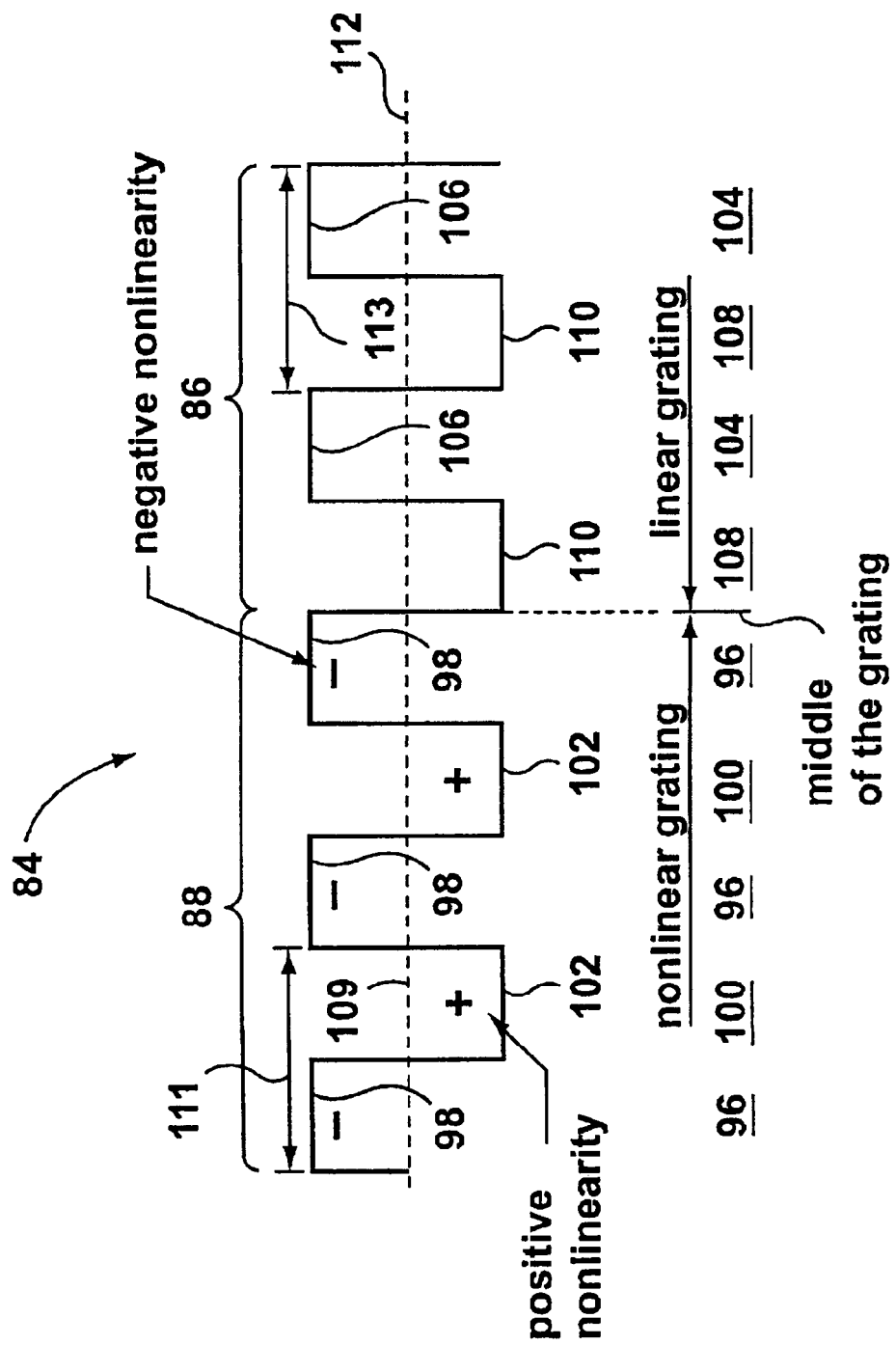
FIG. 10 is a schematic representation of a preferred embodiment of the optical switch, the preferred embodiment including a linear grating portion and a nonlinear grating portion, when the incident light has a relatively low first intensity.

As can be seen in FIG. 10, in the preferred embodiment, the nonlinear grating portion 88 includes a plurality of alternating layers of a negative nonlinear material 96 having a first nonlinear refractive index 98 and a positive nonlinear material 100 having a second nonlinear refractive index 102 when the incident light has a first intensity which is zero or close to zero. The first nonlinear refractive index 98 is higher than the second nonlinear refractive index 102. The linear grating portion 86 and the nonlinear grating portion 88 meet at an interface 89. The linear grating portion includes a plurality of alternating layers of a first linear material 104 having a first linear refractive index 106 and a second linear material 108 having a second linear refractive index 110. The first linear refractive index 106 is higher than the second linear refractive index 110. The nonlinear grating portion 88 has a first average nonlinear refractive index 109, and the linear grating portion 86 also has an average linear refractive index 112 which is substantially equivalent to the first average nonlinear refractive index 109.

In other words, the nonlinear grating portion comprises a periodic arrangement of nonlinear materials 96 and 100 having a negative nonlinear coefficient and a positive nonlinear coefficient respectively. When the incident light has a relatively low first intensity, the negative nonlinear material 96 has a relatively higher first nonlinear refractive index 98 and the positive nonlinear material 100 has a relatively lower second nonlinear refractive index 102. As can be seen in FIGS. 10 and 13, the nonlinear grating portion has a nonlinear grating portion period 111, and the linear grating portion has a linear grating portion period 113 which is substantially equivalent to the nonlinear grating portion period 111.

The nonlinear grating portion 88 and the linear grating portion 86 are positioned relative to each other such that the first nonlinear grating portion sequence and the linear grating portion sequence form a continuous sequence of alternating relatively higher and relatively lower refractive indices along the length of the optical switch 84. In these circumstances, the incident light having the first intensity is substantially reflected.

Figure 11:
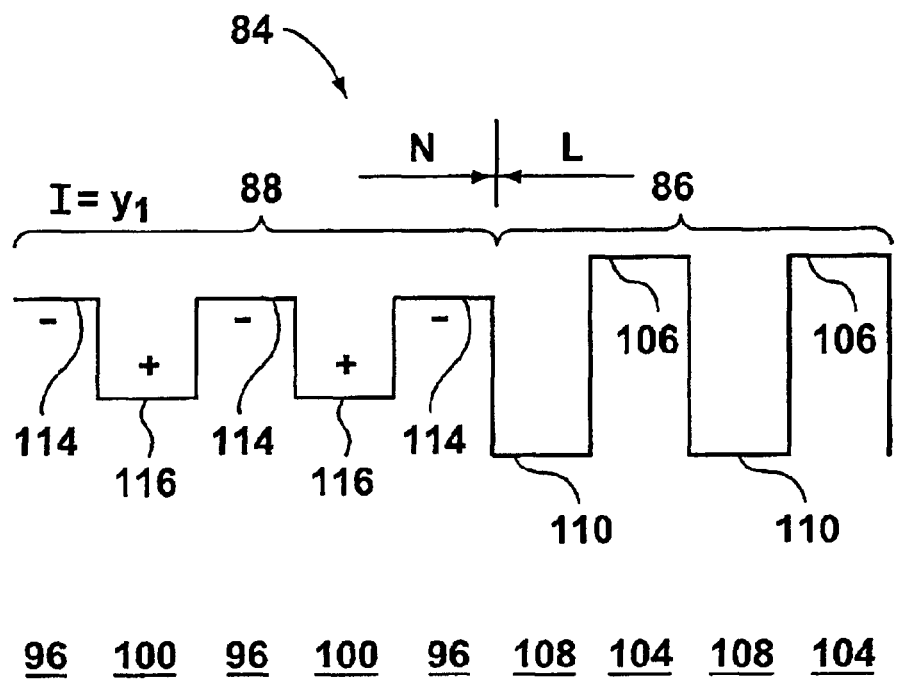
FIG. 11 is a schematic representation of the optical switch of FIG. 10 in which the incident light has a relatively low intensity $y_1$, $y_1$ being greater than the first intensity.

FIGS. 10–13 show the effect of gradually increasing the intensity of the incident light on the optical switch 84. In FIG. 11, the intensity of the incident light is $y_1$, $y_1$ being relatively low, but a greater intensity than the intensity of the incident light resulting in FIG. 10. As can be seen in FIG. 11, due to the increase in intensity of the incident light, the negative nonlinear material 96 has a refractive index 114 which is lower than the first nonlinear refractive index 98, and the positive nonlinear material 100 has a refractive index 116 which is higher than the second nonlinear refractive index 102.

Figure 12:
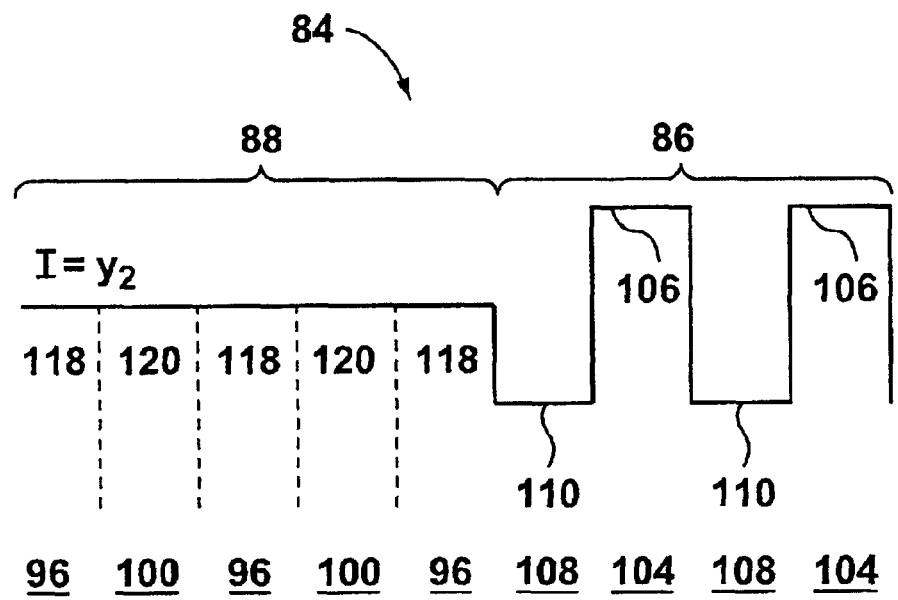
FIG. 12 is a schematic representation of the optical switch of FIG. 10 in which the incident light has a relatively high intensity $y_2$, $y_2$ being greater than $y_1$.

In FIG. 12, the intensity of the incident light is $y_2$, $y_2$ being higher than $y_1$. In FIG. 12, the negative nonlinear material 96 has a refractive index 118 which is still lower than the refractive index 114, and the positive nonlinear material 100 has a refractive index 120 which is higher than the refractive index 116. The refractive index 118 and the refractive index 120 are equivalent.

In FIG. 13, the intensity of the incident light is y, y being a high intensity, and y being higher than $y_2$. The negative nonlinear material 96 has a third nonlinear refractive index 122 which is lower than the refractive index 118, and the positive nonlinear material 100 has a fourth nonlinear refractive index 124 which is higher than the refractive index 120.

As can be seen in FIG. 13, when the incident light has the second intensity, the periodically alternating layers comprising the nonlinear grating portion 88 form a second nonlinear grating portion sequence of alternating relatively higher and relatively lower refractive indices. Also as shown in FIG. 13, the linear grating portion sequence and the nonlinear grating portion sequence form a continuous sequence of alternating relatively higher and relatively lower refractive indices, interrupted by a discontinuity at the interface. When the incident light has the second intensity, the nonlinear grating portion has a first average nonlinear refractive index 126 which is substantially equivalent to the average linear refractive index 112. In these circumstances, which arise when the incident light has the second intensity, light having a narrow band of frequencies is substantially transmitted.

Figure 14:
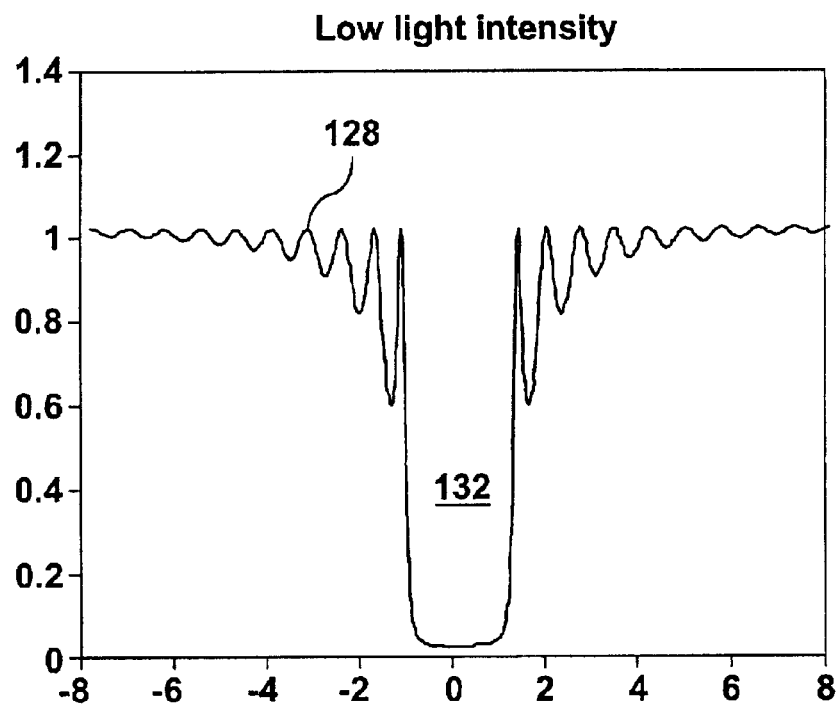
FIG. 14 is a graphic illustration of the transmission function for the optical switch of FIG. 10 when the incident light has the first intensity.
Figure 15:
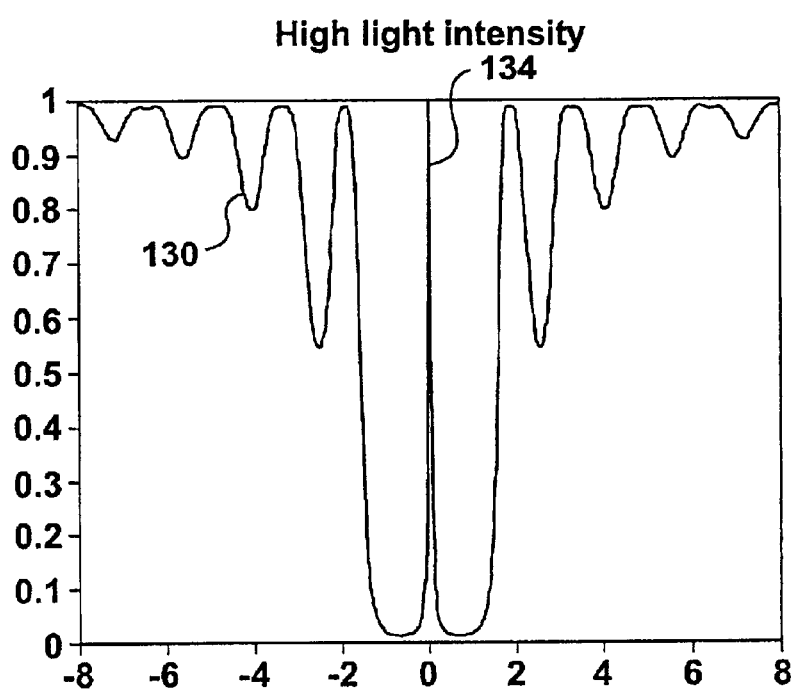
FIG. 15 is a graphic illustration of the transmission function for the optical switch of FIG. 13, when the incident light has a high intensity y.

FIG. 14 shows a transmission function 128 for the optical switch 84 when the incident light has an intensity which is close to zero, i.e., the transmission function which corresponds to the schematic representation of FIG. 10. FIG. 15 shows a transmission function 130 for the optical switch 84 when the incident light has a high intensity y. As can be seen in FIGS. 14 and 15, a reflection gap 132 in FIG. 14 is not shown in FIG. 15. Instead, the transmission function 130 includes a sharply defined point 134, showing that the optical switch 84 transmits a narrow band of frequencies at high intensities, the frequencies being within the reflection gap 132. In effect, a phase shift of π is created between the linear grating portion 86 and the nonlinear grating portion 88 at high light intensities.

By manipulating variations in the average refractive indices of the nonlinear grating portion 88 and the linear grating portion 86, and by manipulating the respective periods of the nonlinear grating portion 88 and the linear grating portion 86, a designer can cause changes in the general shape of the transmission function to achieve certain desired results for light having at least one narrow band of frequencies. For example, in the optical switch 84 schematically represented in FIGS. 10–13, the respective periods of the nonlinear grating portion 88 and the linear grating portion 86 are substantially the same. As will be described, in certain embodiments of the invention, at higher intensities, the transmission of light having at least one narrow band of frequencies can also be achieved, not when the average refractive indices of the nonlinear grating portion and the linear grating portion are substantially the same, but by manipulation of the respective periods of the nonlinear grating portion and the linear grating portion.

As can be seen in FIG. 13, when the incident light has the second intensity, the nonlinear grating portion 88 has a second nonlinear grating portion sequence. It can also be seen in FIG. 13 that the second nonlinear grating portion sequence and the linear grating portion sequence form a continuous sequence of alternating relatively higher and relatively lower refractive indices along the optical switch, interrupted by a discontinuity at the interface of the nonlinear grating portion 88 and the linear grating portion 86.

It should be noted that the configuration shown in FIGS. 10–13 is one example of the preferred embodiment. FIG. 10 shows that, when the incident light has the first intensity, the nonlinear grating portion 88 has a first nonlinear grating portion sequence of periodic variation between the relatively higher first nonlinear refractive index and the relatively lower second nonlinear refractive index. The linear grating portion 86 has a linear grating portion sequence of periodic variation between the relatively higher first linear refractive index and the relatively lower refractive index. As can be seen in FIG. 10, the nonlinear grating portion 88 and the linear grating portion 86 are positioned relative to each other such that the first nonlinear grating portion sequence and the linear grating portion sequence form a continuous sequence of alternating relatively higher and relatively lower refractive indices along the optical switch 84. The preferred embodiment also includes a configuration (not shown) in which the positive nonlinear material 100 of the nonlinear grating portion 88 is in contact with the first linear material 104 of the linear grating portion 86. This alternative configuration of the preferred embodiment would function similarly to the embodiment shown in FIG. 10. In this alternative configuration, the first nonlinear grating portion sequence and the linear grating portion sequence would form a continuous sequence of alternating relatively higher and relatively lower refractive indices along the optical switch 84. Also, in this alternative configuration, the second nonlinear grating portion sequence and the linear grating portion sequence would form a continuous sequence of alternating relatively higher and relatively lower refractive indices along the optical switch 84, interrupted by a discontinuity at the interface.

As shown in FIG. 16, the preferred embodiment of the optical switch 84 receives the incident light having a certain frequency, represented by arrow 136, and depending on the intensity of the incident light, the incident light is substantially reflected, as indicated by arrow 138, or the incident light is substantially transmitted, as indicated by arrow 140. If the intensity is relatively low, the incident light is substantially reflected, and if the incident light's intensity is relatively high, the incident light is substantially transmitted.

Figure 17:
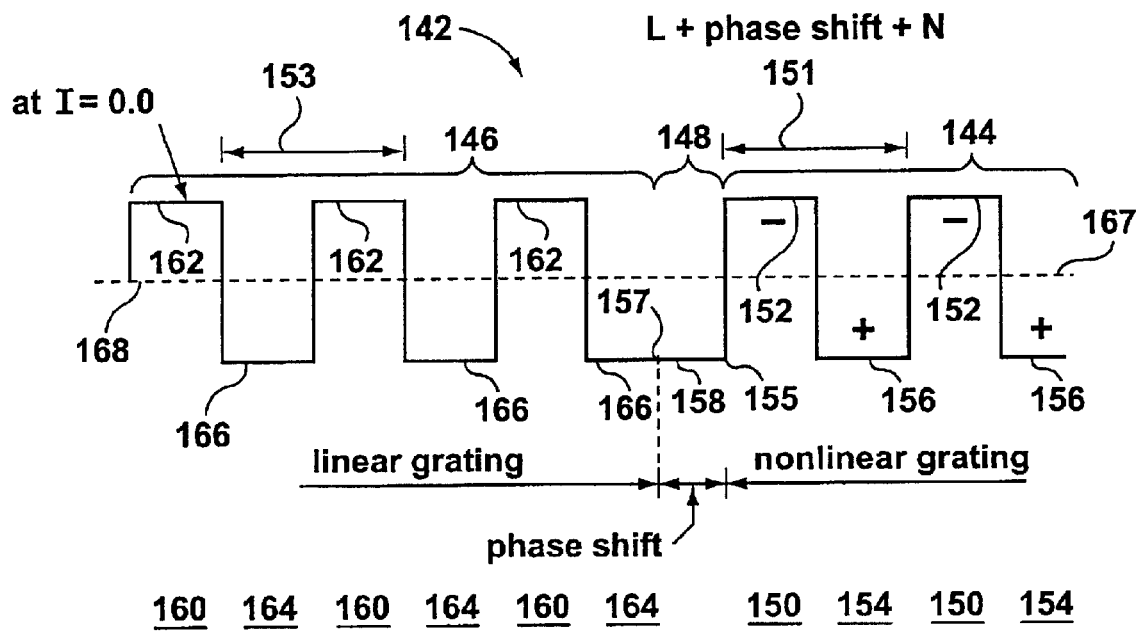
FIG. 17 is a schematic representation of another embodiment of the invention including a linear grating portion, a nonlinear grating portion, and a phase shift portion, in which the incident light has a relatively low first intensity.
Figure 18:
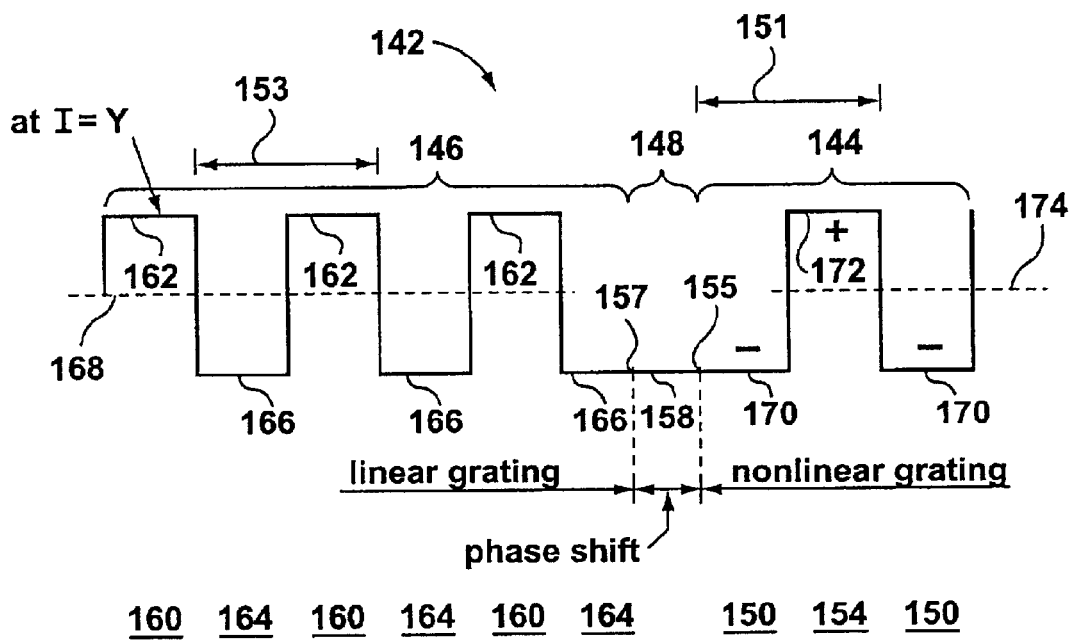
FIG. 18 is a schematic representation of the embodiment of FIG. 17 in which the incident light has a high intensity y, y being greater than the first intensity.

Another embodiment of an optical switch 142 is schematically represented in FIG. 17. The optical switch 142 has a nonlinear grating portion 144, a linear grating portion 146, and a phase shift portion 148 disposed between the nonlinear grating portion 144 and the linear grating portion 146. The nonlinear grating portion 144 has a plurality of periodically alternating layers of a negative nonlinear material 150 having a first nonlinear refractive index 152 and a positive nonlinear material 154 having a second nonlinear refractive index 156 when the incident light has a first intensity which is zero, or close to zero. As shown in FIGS. 17 and 18, the phase shift portion 148 has a phase shift refractive index 158. The linear grating portion 146 includes a plurality of periodically alternating layers of a first linear material 160 having a first linear refractive index 162 and a second linear material 164 having a second linear refractive index 166. The nonlinear grating portion 144 has a first average nonlinear refractive index 167 in FIG. 17. As can be seen in FIG. 17, the first linear refractive index 162 is higher than the second refractive index 166, and the linear grating portion 146 has an average linear refractive index 168.

As can also be seen in FIGS. 17 and 18, the nonlinear grating portion 144 has a nonlinear grating portion period 151, and the linear grating portion 146 has a linear grating portion period 153 which is substantially equivalent to the nonlinear grating portion period 151. Also, the nonlinear grating portion 144 and the phase shift portion 148 meet at a nonlinear portion interface 155, and the linear grating portion 146 and the phase shift portion 148 meet at a linear portion interface 157.

As can be seen in FIG. 17, the nonlinear grating portion 144 has a first nonlinear grating portion sequence of alternating relatively higher and relatively lower refractive indices when the incident light has the first intensity, and the linear grating portion 146 has a linear grating portion sequence of alternating relatively higher and relatively lower refractive indices as well. The nonlinear grating portion 144 and the linear grating portion 146 are positioned relative to each other so that, when the incident light has the first intensity, the nonlinear grating portion sequence and the linear grating portion sequence form a continuous sequence of alternating relatively higher and relatively lower refractive indices along the optical switch 142, interrupted by a first discontinuity at the phase shift portion 148.

The first average nonlinear refractive index 167 is substantially equivalent to the average linear refractive index 168. When the incident light has the relatively low first intensity, light having a first narrow band of frequencies is substantially transmitted.

In FIG. 18, the optical switch 142 is schematically represented when the incident light has a second intensity y which is relatively high. The negative nonlinear material 150 has a third nonlinear refractive index 170 which is lower than the first nonlinear refractive index 152, and the positive nonlinear material 154 has a fourth nonlinear refractive index 172 which is higher than the second nonlinear refractive index 156.

As can be seen in FIG. 18, when the incident light has the second intensity, the periodically alternating layers comprising the nonlinear grating portion 144 form a second nonlinear grating portion sequence of relatively higher and relatively lower refractive indices. When the incident light has the second intensity, the second nonlinear grating portion sequence and the linear grating portion sequence form a continuous sequence of alternating relatively higher and relatively lower refractive indices, interrupted by a second discontinuity at the phase shift portion 148. Also, the nonlinear grating portion 144 has a second average nonlinear refractive index which is substantially equivalent to the average linear refractive index 168, so that light having a second narrow band of frequencies is substantially transmitted.

It should be noted that FIGS. 17 and 18 show one example of the embodiment of the optical switch 142. For example, a configuration (not shown) in which the first linear material 160 and the positive nonlinear material 154 are positioned adjacent to the phase shift portion 148 could also be used. Also, the phase shift refractive index 158 need not be equivalent to any refractive index of any layer of the nonlinear grating portion 144 or the linear grating portion 146.

As another example of an alternative configuration (not shown) of the embodiment represented in FIGS. 17 and 18, such an alternative configuration could be constructed so that, although the alternative configuration substantially transmits light having a first narrow band of frequencies at low intensities, the incident light is substantially reflected at high intensities.

Figure 19:
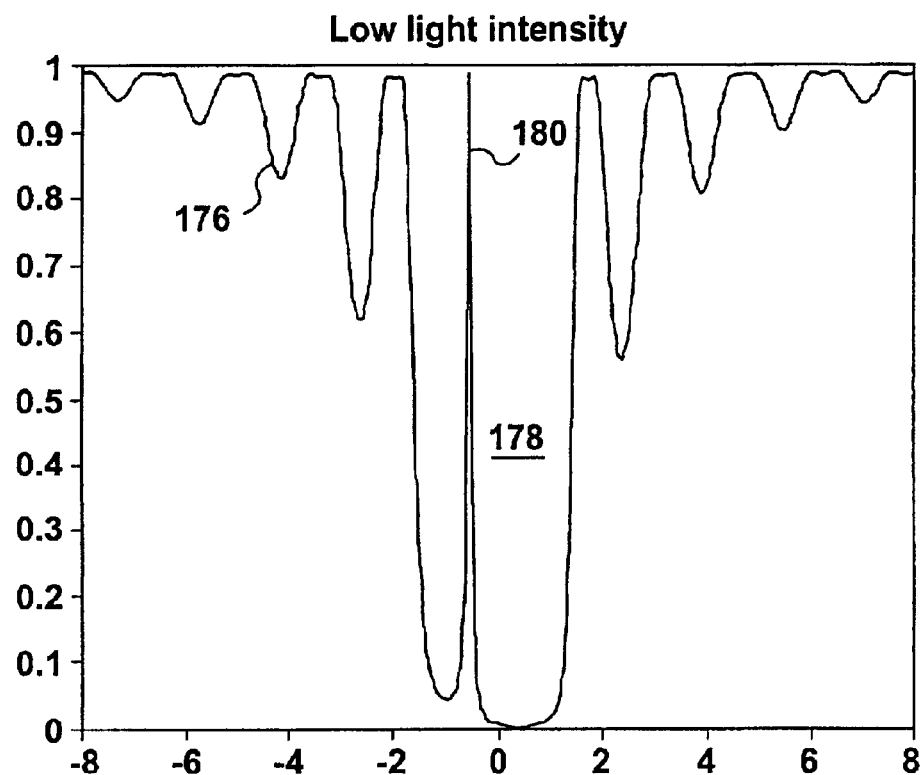
FIG. 19 is a graphic illustration of the transmission function for the optical switch of FIG. 17.

FIG. 19 shows a transmission function 176 for the optical switch 142 as schematically represented in FIG. 17, having a relatively narrow reflection gap 178 and a narrow point 180 in the reflection gap 178. As can be seen in FIG. 19, when the incident light is at a relatively low first intensity, a first narrow band of frequencies within the reflection gap 178 is transmitted.

Figure 20:
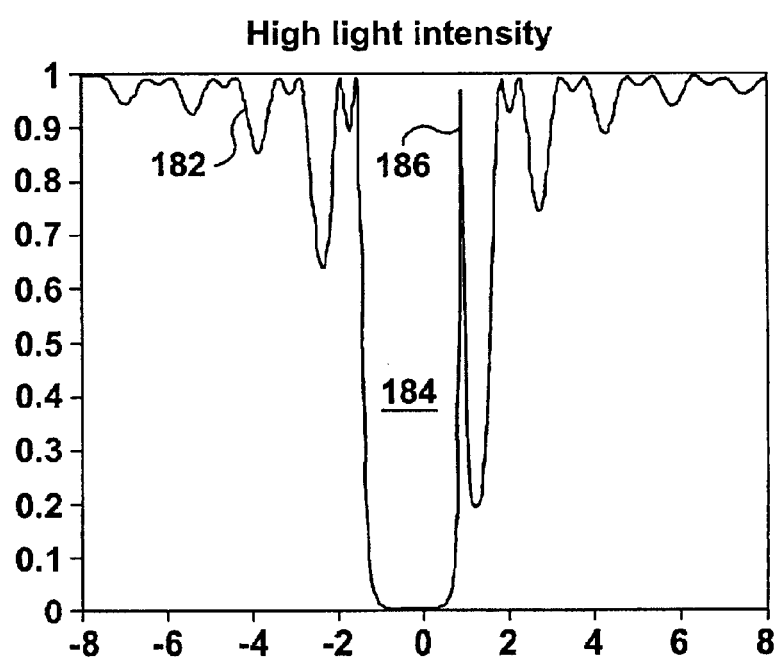
FIG. 20 is a graphic illustration of the transmission function for the optical switch of FIG. 18.

FIG. 20 shows a transmission function 182 for the optical switch 142 as schematically represented in FIG. 18, when the incident light has a relatively high intensity y. In contrast to the transmission function 176, the transmission function 182 has a reflection gap 184 which differs from the reflection gap 178. Similarly, FIG. 20 shows a narrow point 186 which indicates that a different, second narrow band of frequencies is transmitted at relatively high intensities. In other words, unlike the preferred embodiment of the optical switch 84, the optical switch 142 transmits a first narrow band of frequencies at relatively low intensities, and the optical switch 142 also transmits a second, different band of frequencies at relatively high intensities.

Figure 21:
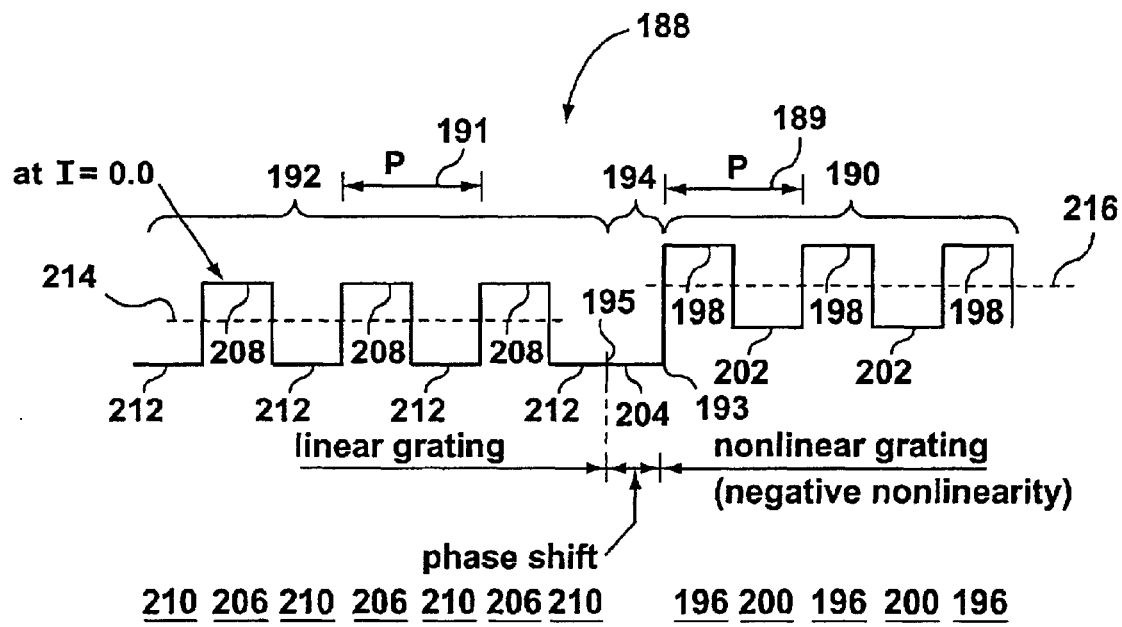
FIG. 21 is a schematic representation of yet another embodiment of the invention including a linear grating portion, a nonlinear grating portion which is negative, and a phase shift portion when the incident light has a relatively low first intensity.

Another embodiment of an optical switch 188 is schematically represented in FIG. 21. The optical switch 188 has a nonlinear grating portion 190, a linear grating portion 192, and a phase shift portion 194 disposed between the nonlinear grating portion 190 and the linear grating portion 192. The nonlinear grating portion 190 has a plurality of periodically alternating layers of a first negative nonlinear material 196 having a first nonlinear refractive index 198 and a second negative nonlinear material 200 having a second nonlinear refractive index 202 when the incident light has a first intensity which is zero, or close to zero. As shown in FIG. 21, the phase shift portion 194 has a phase shift refractive index 204. The linear grating portion 192 includes a plurality of periodically alternating layers of a first linear material 206 having a first linear refractive index 208 and a second linear material 210 having a second linear refractive index 212. As can be seen in FIG. 21, the linear grating portion 192 has an average linear refractive index 214. At low intensities, the nonlinear grating portion 190 has a first average nonlinear refractive index 216, and the first average nonlinear refractive index 216 differs substantially from the average linear refractive index 214.

Figure 22:
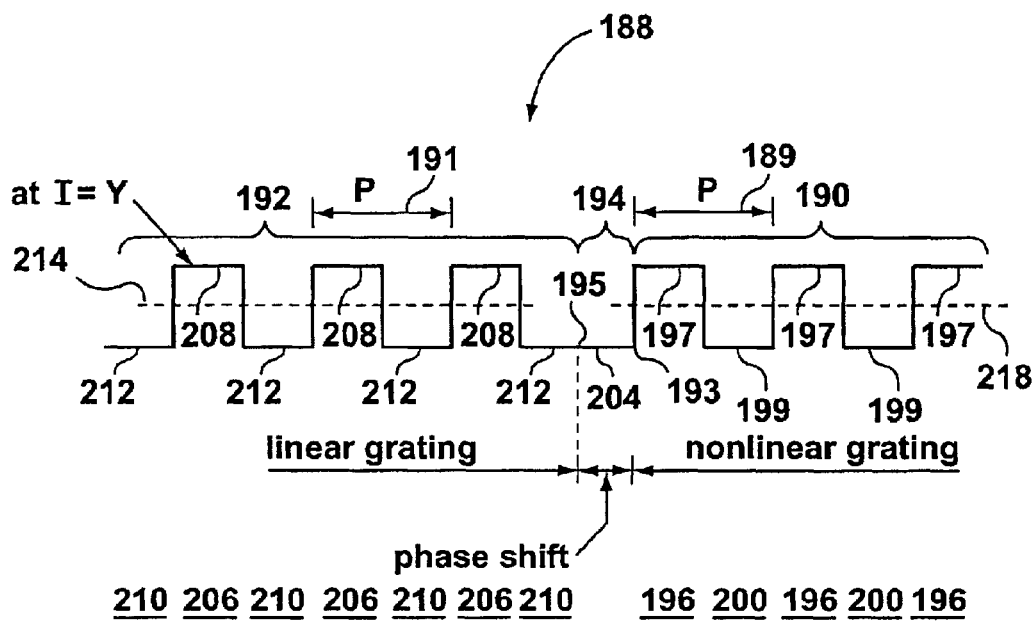
FIG. 22 is a schematic representation of the embodiment of FIG. 21 when the incident light has a high intensity y, y being greater than the first intensity.

As can also be seen in FIGS. 21 and 22, the nonlinear grating portion 190 has a nonlinear grating portion period 189, and the linear grating portion 192 has a linear grating portion period 191 which is substantially equivalent to the nonlinear grating portion period 189. Also, the nonlinear grating portion 190 and the phase shift portion 194 meet at a nonlinear portion interface 193 and the linear grating portion 192 and the phase shift portion 194 meet at a linear portion interface 195.

As can be seen in FIG. 21, the nonlinear grating portion 190 has a first nonlinear grating portion sequence of alternating relatively higher and relatively lower refractive indices when the incident light has the first intensity, and the linear grating portion 192 has a linear grating portion sequence of alternating relatively higher and relatively lower refractive indices as well. The nonlinear grating portion 190 and the linear grating portion 192 are positioned relative to each other so that, when the incident light has the first intensity, the nonlinear grating portion sequence and the linear grating portion sequence form a continuous sequence of alternating relatively higher and relatively lower refractive indices along the optical switch 188, interrupted by a discontinuity at the phase shift portion 194. In these circumstances, when the incident light has the relatively low first intensity, the incident light is substantially reflected.

In FIG. 22, it can be seen that, at relatively high intensities, the nonlinear grating portion 190 has a second average nonlinear refractive index 218 which is substantially equivalent to the average linear refractive index 214. The first negative nonlinear material 196 has a third nonlinear refractive index 197 which is lower than the first nonlinear refractive index 198, and the second nonlinear material 200 has a fourth nonlinear refractive index 199 which is lower than the second nonlinear refractive index 202. The fourth nonlinear refractive index 199 is substantially equivalent to the second linear refractive index 212 and the phase shift refractive index 204.

As can be seen in FIG. 22, when the incident light has the second intensity, the periodically alternating layers comprising the nonlinear grating portion 190 form a second nonlinear grating portion sequence of relatively higher and relatively lower refractive indices. When the incident light has the second intensity, the second nonlinear grating portion sequence and the linear grating portion sequence form a continuous sequence of alternating relatively higher and relatively lower refractive indices, interrupted by the discontinuity at the phase shift portion 194. Also, as the second average nonlinear refractive index 218 is substantially equivalent to the average linear refractive index 214, light having a narrow band of frequencies is substantially transmitted.

It should be noted that FIGS. 21 and 22 show only one example of the embodiment of the optical switch 188. For example, a configuration (not shown) in which the first linear material 206 and the second negative nonlinear material 200 are positioned adjacent to the phase shift portion 194 could also be used. Also, the phase shift refractive index 204 need not be equivalent to any refractive index of any layer of the nonlinear grating portion 190 or the linear grating portion 192.

As another example of an alternative configuration (not shown) of the embodiment represented in FIGS. 21 and 22, such an alternative configuration could be constructed so that, at low intensities, light having at least one narrow band of frequencies is substantially transmitted, and at high intensities, the incident light is substantially reflected.

Figure 23:
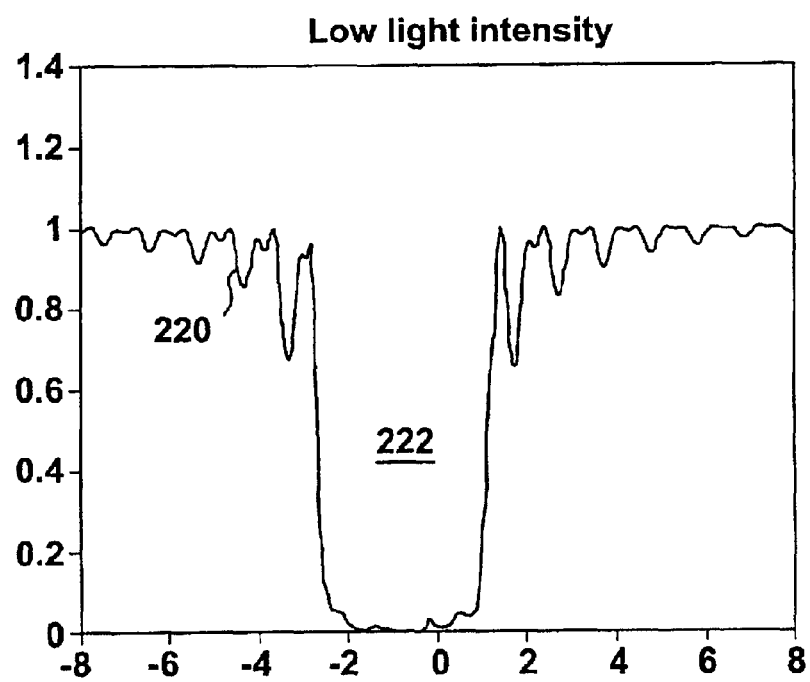
FIG. 23 is a graphic illustration of the transmission function for the optical switch of FIG. 21.
Figure 24:
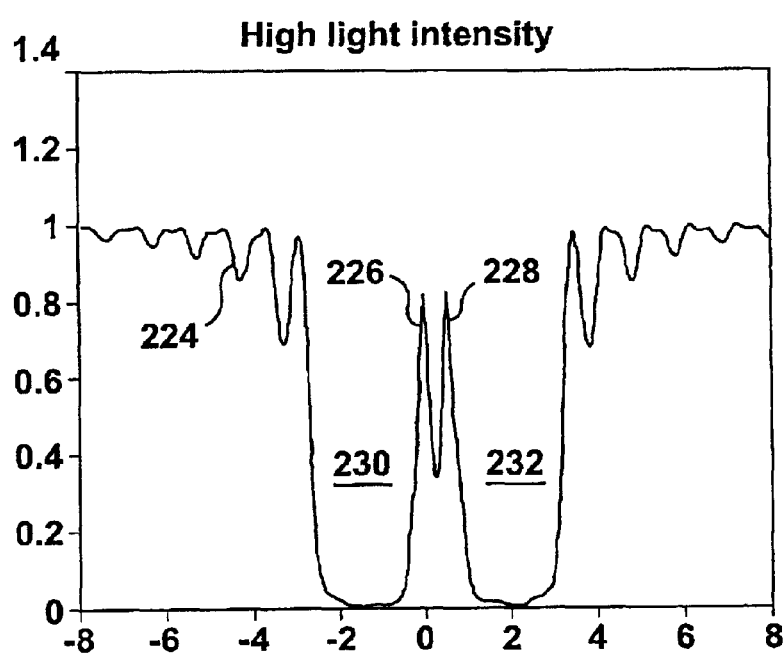
FIG. 24 is a graphic illustration of the transmission function for the optical switch of FIG. 22.

FIG. 23 shows a transmission function 220 corresponding to the optical switch 188 as schematically represented in FIG. 21. The transmission function has a reflection gap 222. When the incident light has relatively low intensity, the incident Light is substantially reflected by the optical switch 188. A transmission function 224, corresponding to the optical switch 188 as shown in FIG. 22, is shown in FIG. 24. The transmission function 224 appears to have two narrow points 226 and 228 disposed adjacent to reflection gaps 230 and 232 respectively. The result is that, at high intensities, two distinct, narrow bands of frequencies are substantially transmitted, as shown in FIG. 24.

Figure 25:
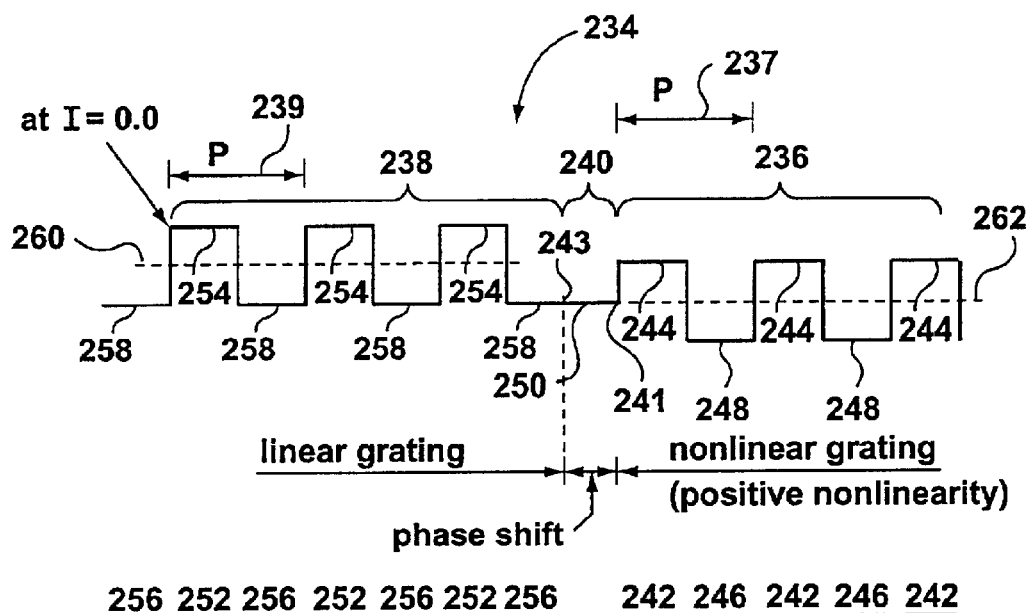
FIG. 25 is a schematic representation of yet another embodiment of the optical switch, including a linear grating portion, a nonlinear grating portion which is positive, and a phase shift portion, when the incident light has a relatively low first intensity.

Another embodiment of an optical switch 234 is shown in FIG. 25. The optical switch 234 includes a nonlinear grating portion 236, a linear grating portion 238, and a phase shift portion 240. FIG. 25 represent the optical switch 234 when the incident light has a first intensity which is zero, or close to zero. The nonlinear grating portion 236 includes a plurality of periodically alternating layers of a first positive nonlinear material 242 having a first nonlinear refractive index 244 and a second positive nonlinear material 246 having a second nonlinear refractive index 248. The first nonlinear refractive index 244 is higher than the second nonlinear refractive index 248 at low intensities. As shown in FIG. 25, the phase shift portion 240 has a phase shift refractive index 250. The linear grating portion 238 includes a plurality of periodically alternating layers of a first linear material 252 having a first linear refractive index 254 and a second linear material 256 having a second linear refractive index 258. The first linear refractive index 254 is higher than the second linear refractive index 258. As can be seen in FIG. 25, when the incident light has the first intensity, the nonlinear grating portion 236 has a first average nonlinear refractive index 262 which differs substantially from the average linear refractive index 260 of the linear grating portion 238.

Figure 26:
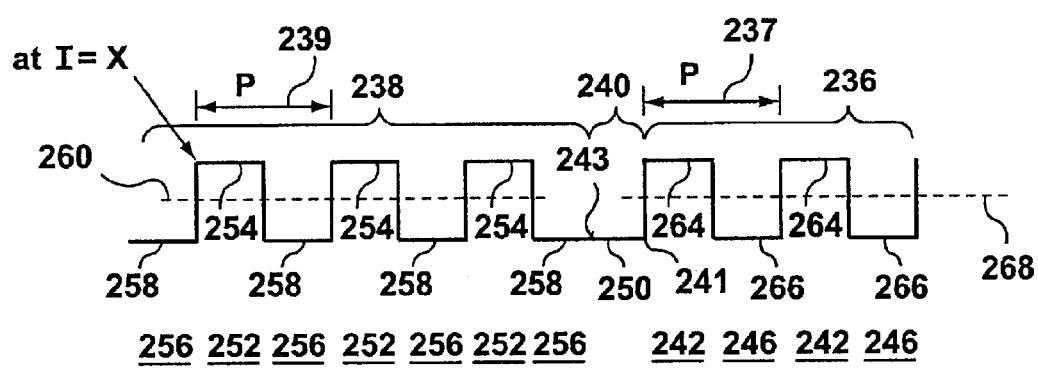
FIG. 26 is a schematic representation of the embodiment of FIG. 25, when the incident light has a high intensity y, y being greater than the first intensity.

As can be seen in FIGS. 25 and 26, the nonlinear grating portion 236 has a nonlinear grating portion period 237, and the linear grating portion 238 has a linear grating portion period 239 which is substantially equivalent to the nonlinear grating portion period 237. Also, the nonlinear grating portion 236 and the phase shift portion 240 meet at a nonlinear portion interface 241 and the linear grating portion 238 and the phase shift portion 240 meet at a linear portion interface 243.

As can be seen in FIG. 25, the nonlinear grating portion 236 has a first nonlinear grating portion sequence of alternating relatively higher and relatively lower refractive indices when the incident light has the first intensity, and the linear grating portion 238 has a linear grating portion sequence of alternating relatively higher and relatively lower refractive indices as well. The nonlinear grating portion 236 and the linear grating portion 238 are positioned relative to each other so that, when the incident light has the first intensity, the nonlinear grating portion sequence and the linear grating portion sequence form a continuous sequence of alternating relatively higher and relatively lower refractive indices along the optical switch 234, interrupted by a discontinuity at the phase shift portion 240. When the incident light has the relatively low first intensity, the incident light is substantially reflected.

In FIG. 26, the incident light has a second intensity y which is relatively high. The first positive nonlinear material 242 has a third nonlinear refractive index 264 which is higher than the first nonlinear refractive index 244, and the second positive nonlinear material 246 has a fourth nonlinear refractive index 266, which is higher than the second nonlinear refractive index 248. The nonlinear grating portion 236 has a second average nonlinear refractive index 268 which is substantially equivalent to the average linear refractive index 260.

As can be seen in FIG. 26, when the incident light has the second intensity, the periodically alternating layers comprising the nonlinear grating portion 236 form a second nonlinear grating portion sequence of relatively higher and relatively lower refractive indices. When the incident light has the second intensity, the second nonlinear grating portion sequence and the linear grating portion sequence form a continuous sequence of alternating relatively higher and relatively lower refractive indices, interrupted by the discontinuity at the phase shift portion 240. Also, as the second average nonlinear refractive index 268 is substantially equivalent to the average linear refractive index 260, light having a narrow band of frequencies is substantially transmitted.

It should be noted that FIGS. 25 and 26 show only one example of the embodiment of the optical switch 234. For example, a configuration (not shown) in which the first linear material 252 and the second positive nonlinear material 246 are positioned adjacent to the phase shift portion 240 could also be used. Also, the phase shift refractive index 250 need not be equivalent to any refractive index of any layer of the nonlinear grating portion 236 or the linear grating portion 238.

As another example of an alternative configuration (not shown) of the embodiment represented in FIGS. 25 and 26, such an alternative configuration could be constructed so that, at low intensities, light having at least one narrow band of frequencies is substantially transmitted, and at high intensities, the incident light is substantially reflected.

Figure 27:
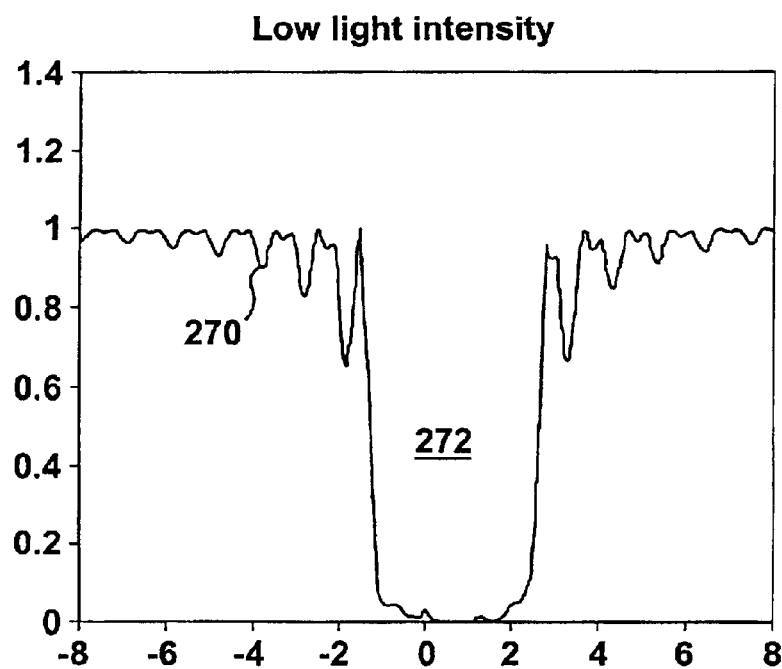
FIG. 27 is a graphic illustration of the transmission function for the optical switch of FIG. 25.
Figure 28:
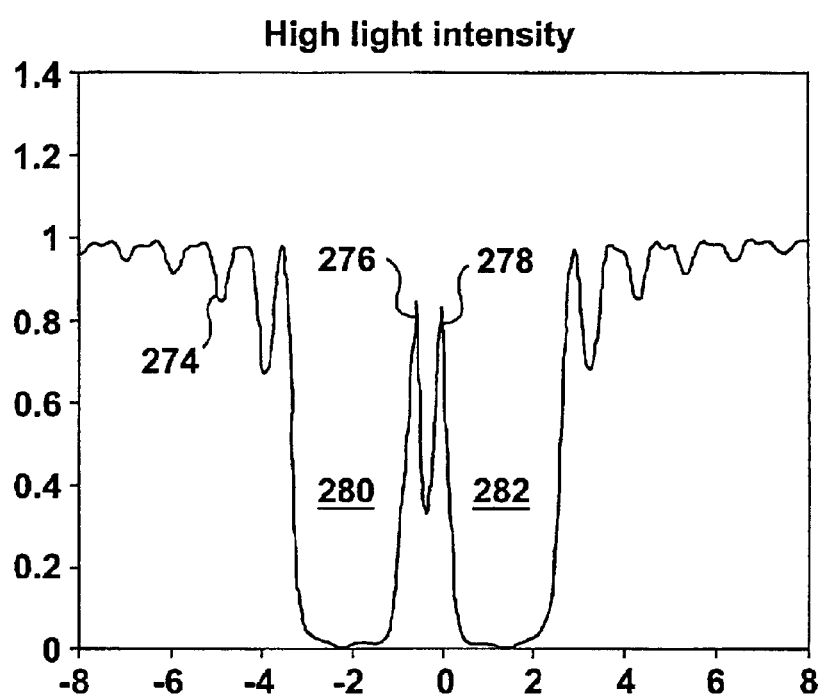
FIG. 28 is a graphic illustration of the transmission function for the optical switch of FIG. 26.

The result is that, when the incident light has the first intensity, the incident light is substantially reflected by the optical switch 234, and when the incident light has the second intensity, light having at least one narrow band of frequencies is substantially transmitted. This can be seen in FIGS. 27 and 28. In FIG. 27, a transmission function 270 for the optical switch 234 as schematically represented in FIG. 25 is shown. The transmission function 270 includes a reflection gap 272. A transmission function 274 is shown in FIG. 28, the transmission function 274 being for the optical switch 234, as schematically represented in FIG. 26. As can be seen in FIG. 28, the transmission function 274 includes two narrow points 276, 278 disposed adjacent to reflection gaps 280, 282 respectively. FIG. 28 shows that, at high intensities, two distinct, narrow bands of frequencies are substantially transmitted by the optical switch 234.

Figure 29:
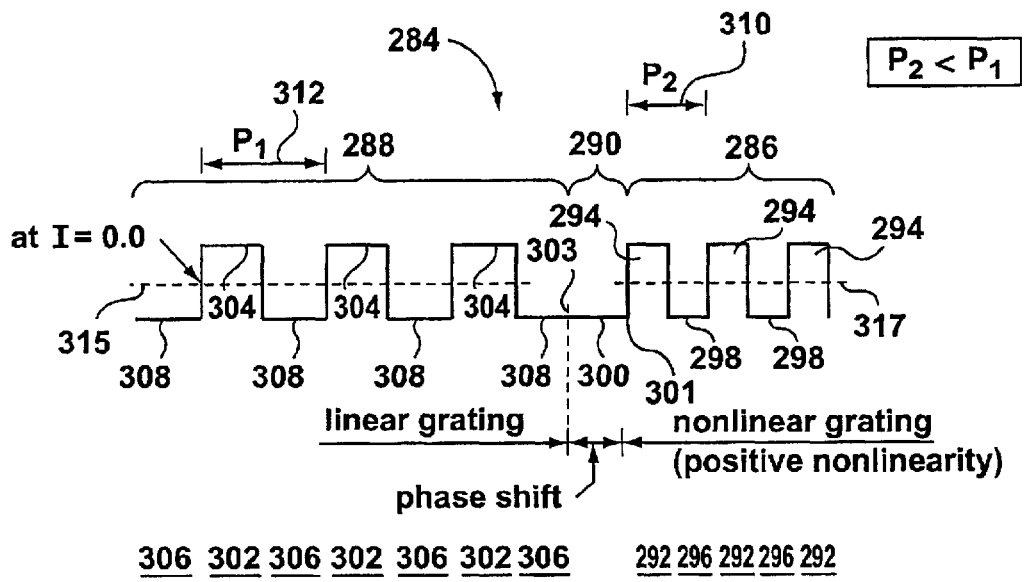
FIG. 29 is a schematic representation of yet another embodiment of the optical switch, including a linear grating portion having a period $P_1$, a positive nonlinear grating portion having a period $P_2$, $P_2$ being less than $P_1$, and a phase shift portion when the incident light has a relatively low first intensity.

In the optical switches 84, 142, 188, and 234, the periods of the respective nonlinear grating portions are equal to the periods of the respective linear grating portions. FIG. 29 is a schematic representation of an embodiment of an optical switch 284 having a nonlinear grating portion 286, a linear grating portion 288, and a phase shift portion 290 disposed between the nonlinear grating portion 286 and the linear grating portion 288. As will be described, the period of the nonlinear grating portion 286 is not equivalent to the period of the linear grating portion 288.

FIG. 29 schematically represents the optical switch 284 when the incident light has a first intensity which is zero, or close to zero. As shown in FIG. 29, the nonlinear grating portion 286 includes a plurality of periodically alternating layers of a first positive nonlinear material 292 having a first nonlinear refractive index 294 and a second positive nonlinear material 296 having a second nonlinear refractive index 298. The first nonlinear refractive index 294 is higher than the second nonlinear refractive index 298, when an incident light has a relatively low first intensity. The phase shift portion 290 has a phase shift refractive index 300.

The linear grating portion 288 includes a plurality of periodically alternating layers of a first linear material 302 having a first linear refractive index 304 and a second linear material 306 having a second linear refractive index 308. The first linear refractive index 304 is higher than the second linear refractive index 308. Also, as can be seen in FIG. 29, the nonlinear grating portion 286 has a first average nonlinear refractive index 317 (also designated $n_1$) which is substantially equivalent to an average linear refractive index 315 of the linear grating portion 288 ($n_0$). The nonlinear grating portion 286 and the phase shift portion 290 meet at a nonlinear portion interface 301, and the linear grating portion 288 and the phase shift portion 290 meet at a linear portion interface 303.

As shown in FIG. 29, the nonlinear grating has a nonlinear grating period 310 (also designated $P_2$) which is equal to the thickness of a layer of the first positive nonlinear material 292 and a layer of the second positive nonlinear material 296. Also, it can be seen in FIG. 29 that the linear grating has a linear grating period 312 ($P_1$). The linear grating period 312 is the sum of the thicknesses of adjacent layers of the first linear material 302 and the second linear material 306. The nonlinear grating period 310 ($P_2$) is less than the linear grating period 312 ($P_1$).

Figure 30:
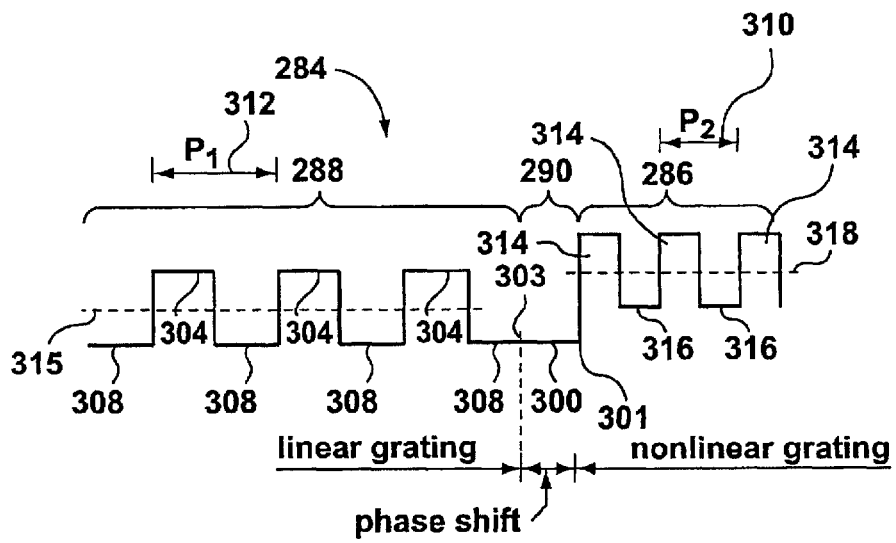
FIG. 30 is a schematic representation of the optical switch of FIG. 27 when the incident light has a high intensity y, y being greater than the first intensity.

FIG. 30 schematically represents the optical switch 284 when the incident light is at a relatively high second intensity y. In these circumstances, the first positive nonlinear material 292 has a third nonlinear refractive index 314, and the second positive nonlinear material 296 has a fourth nonlinear refractive index 316. In FIG. 30, when the incident light has the relatively high second intensity, the nonlinear grating portion 286 has a second average nonlinear refractive index 318 which differs substantially from the average linear refractive index 315.

As can be seen in FIG. 29, when the incident light has the first intensity, the periodically alternating layers comprising the nonlinear grating portion 286 form a first nonlinear grating portion sequence of alternating relatively higher and relatively lower refractive indices. Also, the periodically alternating layers comprising the linear grating portion 288 form a linear grating portion sequence of alternating relatively higher and relatively lower refractive indices. The nonlinear grating portion 286 and the linear grating portion 288 form a continuous sequence of alternating relatively higher and relatively lower refractive indices along the optical switch 284, interrupted by a discontinuity at the phase shift portion 290.

As shown in FIG. 30, when the incident light has the second intensity, the layers comprising the nonlinear grating portion 288 form a second nonlinear grating portion sequence of alternating relatively higher and relatively lower refractive indices. The second nonlinear grating portion sequence and the linear grating portion sequence form a continuous sequence of alternating relatively higher and relatively lower refractive indices, interrupted by the discontinuity at the phase shift portion 290.

When the incident light has the second intensity, the following equation:

$$2n_0P_1 = 2n_2P_2$$

is satisfied, and light having at least one narrow band of frequencies is transmitted. However, in the circumstances where the incident light has the first intensity—i.e., where the corresponding terms for the equation set out above are $2n_0P_1$ and $2n_1P_2$ respectively—the equation is not satisfied. In these circumstances, the incident light is substantially reflected.

The embodiment of the optical switch 284 schematically represented in FIGS. 29 and 30 is one example of a configuration which this embodiment could have.

As another example of an alternative configuration (not shown) of the embodiment represented in FIGS. 29 and 30, such an alternative configuration could be constructed so that, at low intensities, light having at least one narrow band of frequencies is substantially transmitted, and at high intensities, the incident light is substantially reflected.

The transmission functions shown in FIG. 27 and FIG. 28 are equally applicable to the optical switch 284. FIG. 27 shows the transmission function 270 which corresponds to the schematic representation of the optical switch 284 shown in FIG. 29. As can be seen in FIG. 27, and as previously discussed, the transmission function 270 includes a reflection gap 272.

FIG. 28 shows the transmission function 274 including two narrow points 276, 278 which are adjacent to reflection gaps 280, 282 respectively. Although the nonlinear grating portion 286 has the first average nonlinear refractive index 317 which is substantially equivalent to the average linear refractive index 315 of the linear grating portion 288 when the incident light has the first intensity, the incident light is substantially reflected by the optical switch 284 when the incident light has the first intensity. Due to the difference between the periods of the linear grating portion 288 and the nonlinear grating portion 286, light having two narrow bands of frequencies is substantially transmitted when the incident light has the second intensity, as shown in FIG. 28.

Figure 31:
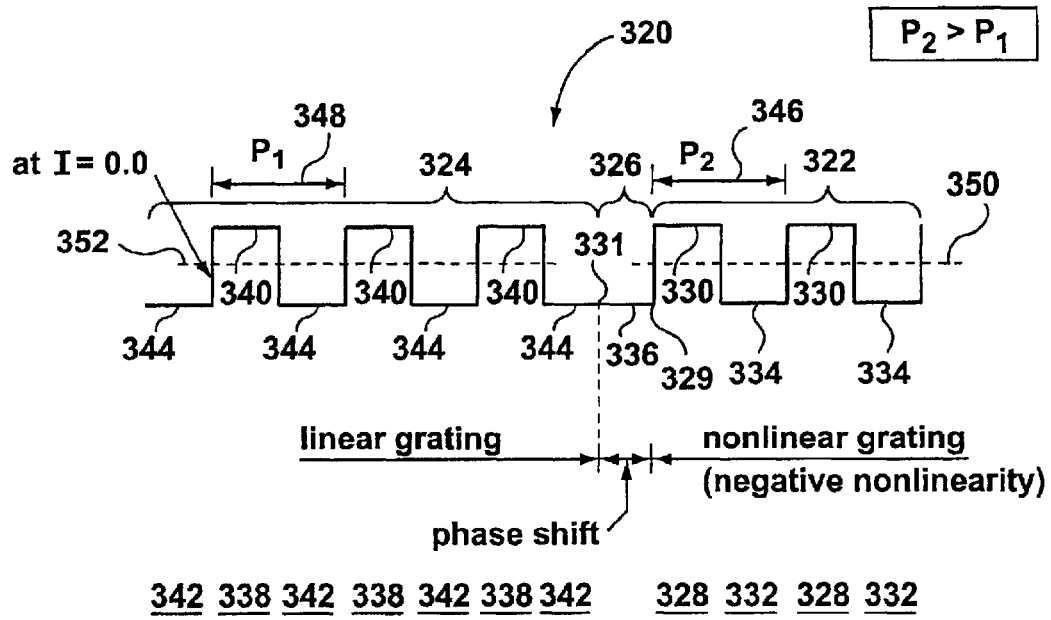
FIG. 31 is a schematic representation of yet another embodiment of the optical switch, including a linear grating portion having a period $P_1$, a negative nonlinear grating portion having a period $P_2$, $P_2$ being greater than $P_1$, and a phase shift portion, when the incident light has a relatively low first intensity.

FIG. 31 is a schematic representation of yet another embodiment of the optical switch 320 having a nonlinear grating portion 322, a linear grating portion 324, and a phase shift portion 326 disposed between the nonlinear grating portion 322 and the linear grating portion 324. The nonlinear grating portion 322 and the phase shift portion 326 meet at a nonlinear portion interface 329, and the linear grating portion 324 and the phase shift portion 326 meet at a linear portion interface 331. FIG. 31 represents the optical switch 320 when the incident light has a first intensity which is zero, or close to zero.

As shown in FIG. 31, the nonlinear grating portion 322 includes a plurality of periodically alternating layers of a first negative nonlinear material 328 having a first nonlinear refractive index 330 and a second negative nonlinear material 332 having a second nonlinear refractive index 334. The first nonlinear refractive index 330 is higher than the second nonlinear refractive index 334 when the incident light has a relatively low first intensity. The phase shift portion 326 has a phase shift refractive index 336. The linear grating portion 324 includes a plurality of periodically alternating layers of a first linear material 338 having a first linear refractive index 340 and a second linear material 342 having a second linear refractive index 344. The first linear refractive index 340 is higher than the second linear refractive index 344. The nonlinear grating portion 322 has a nonlinear grating portion period 346 (also designated $P_2$), and the linear grating portion 324 has a linear grating portion period 348 ($P_1$). As was the case in the optical switch 284, in the optical switch 320, the nonlinear grating portion period 346 ($P_2$) is not equivalent to the linear grating portion period 348 ($P_1$). However, the nonlinear grating portion period 346 ($P_2$) is greater than the linear grating portion period 348 ($P_1$).

It can be seen in FIG. 31 that the nonlinear grating portion 322 has a first average nonlinear refractive index 350 ($n_1$), when the incident light has the relatively low first intensity, which is substantially equivalent to an average linear refractive index 352 ($n_0$) of the linear grating portion 324.

Figure 32:
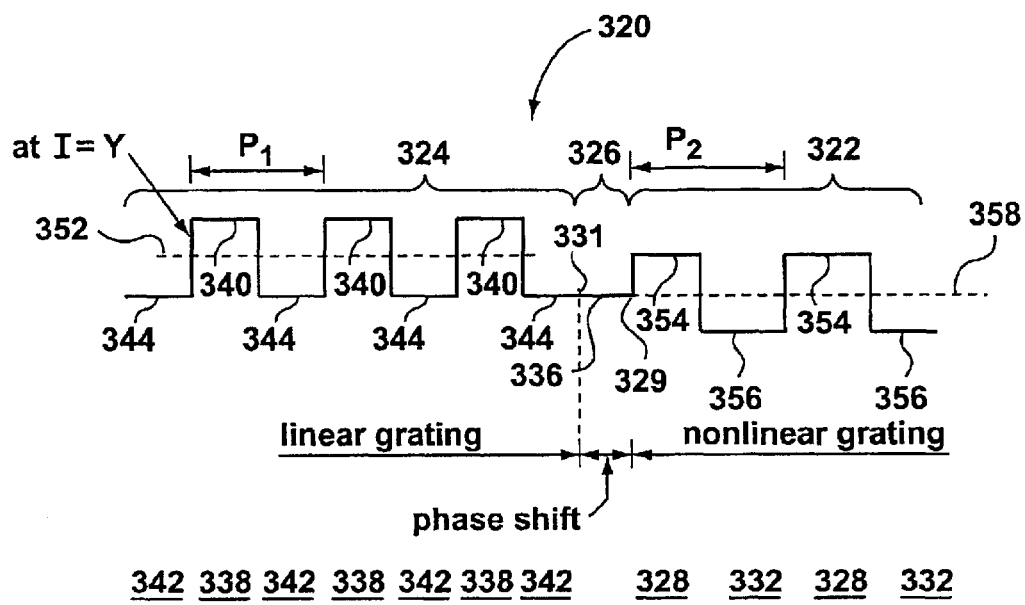
FIG. 32 is a schematic representation of the optical switch of FIG. 31 in which the intensity of the incident light has a relatively high intensity y, y being greater than zero.

FIG. 32 shows the optical switch 320 when the incident light is at a relatively high second intensity y. The first negative nonlinear material 328 has a third nonlinear refractive index 354, and the second negative nonlinear material 332 has a fourth nonlinear refractive index 356. It can be seen that, in FIG. 32, the nonlinear grating portion 322 has a second average nonlinear refractive index 358 ($n_2$) which differs substantially from the average linear refractive index 352 ($n_0$).

As can be seen in FIG. 31, when the incident light has the first intensity, the periodically alternating layers comprising the nonlinear grating portion 322 form a first nonlinear grating portion sequence of alternating relatively higher and relatively lower refractive indices. Also, the periodically alternating layers comprising the linear grating portion 324 form a linear grating portion sequence of alternating relatively higher and relatively lower refractive indices. The nonlinear grating portion 322 and the linear grating portion 324 form a continuous sequence of alternating relatively higher and relatively lower refractive indices along the optical switch 320, interrupted by a discontinuity at the phase shift portion 326.

As shown in FIG. 32, when the incident light has the second intensity, the layers comprising the nonlinear grating portion 322 form a second nonlinear grating portion sequence of alternating relatively higher and relatively lower refractive indices. The second nonlinear grating portion sequence and the linear grating portion sequence form a continuous sequence of alternating relatively higher and relatively lower refractive indices. The second nonlinear grating portion sequence and the linear grating portion sequence form a continuous sequence of alternating relatively higher and relatively lower refractive indices, interrupted by the discontinuity at the phase shift portion 326.

When the incident light has the second intensity, the following equation:

$$2n_0P_1 = 2n_2P_2$$

is satisfied, and light having at least one narrow band of frequencies is transmitted. However, in the circumstances where the incident light has the first intensity—i.e., where the corresponding terms for the equation set out above are $2n_0P_1$ and $2n_1P_2$ respectively—the equation is not satisfied. In these circumstances, the incident light is substantially reflected.

The embodiment of the optical switch 320 schematically represented in FIGS. 31 and 32 is one example of a configuration which this embodiment could have.

As another example of an alternative configuration (not shown) of the embodiment represented in FIGS. 31 and 32, such an alternative configuration could be constructed so that, at low intensities, light having at least one narrow band of frequencies is substantially transmitted, and at high intensities, the incident light is substantially reflected.

The transmission function 220, shown in FIG. 23, corresponds to the schematic representation of the optical switch 320 in FIG. 31. As previously discussed, the transmission function 220 includes the reflection gap 222, indicating that, when the incident light has the first intensity, the incident light is substantially reflected by the optical switch 320.

The transmission function 224 shown in FIG. 24 corresponds to the schematic representation of the optical switch 320 shown in FIG. 32. As previously discussed, the transmission function 224 includes two narrow points 226, 228 adjacent to reflection gaps 230, 232 respectively. As shown in FIG. 24, light having two narrow bands of frequencies is substantially transmitted by the optical switch 320. FIG. 24 indicates that, when the incident light has the second intensity, light having at least one narrow band of frequencies is substantially transmitted by the optical switch 320.

Figure 33:
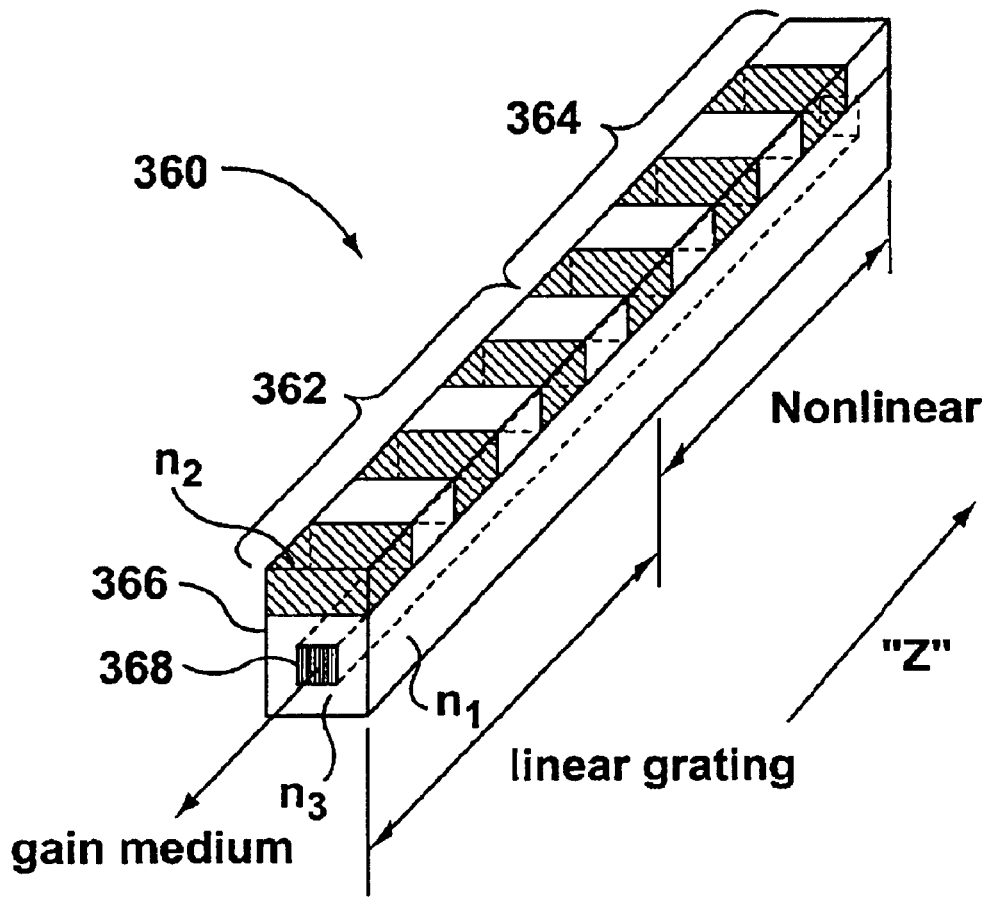
FIG. 33 is an isometric view of another embodiment of the optical switch of the invention, including a gain medium.
Figure 34:
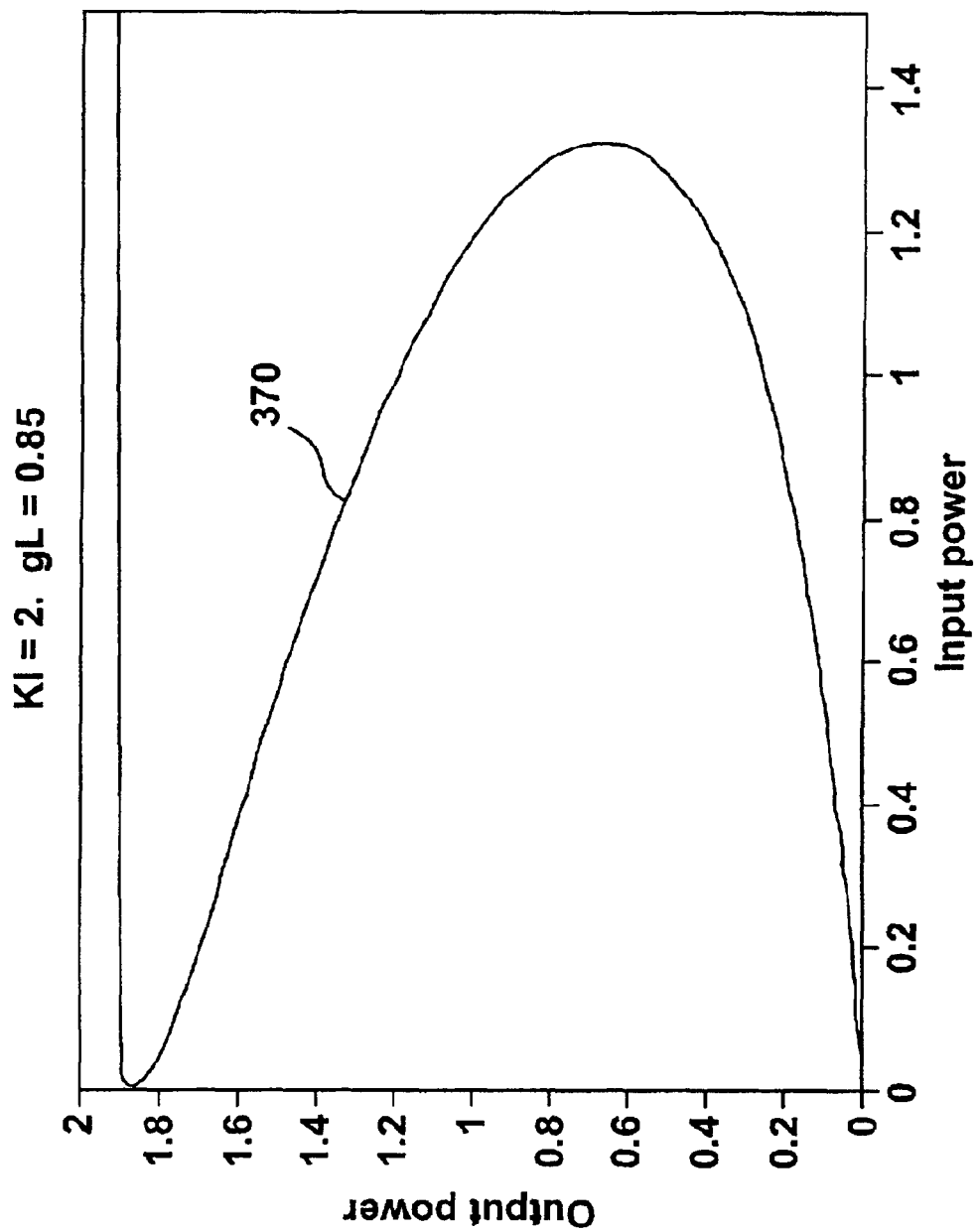
FIG. 34 is a graphical illustration of the transmission function for the optical switch of FIG. 33.
Figure 35:
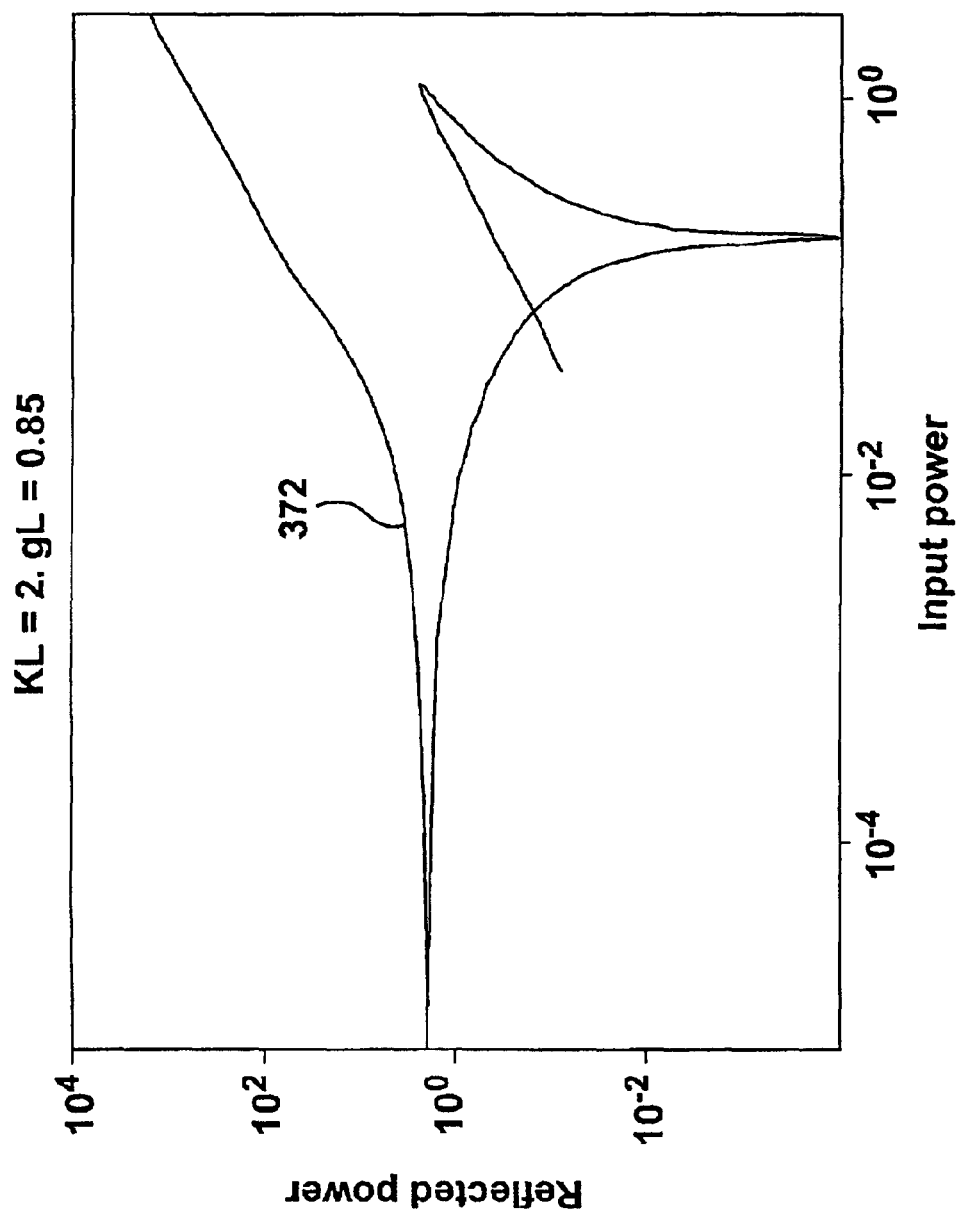
FIG. 35 is a graphical illustration of the reflection function for the optical switch of FIG. 33.

FIG. 33 shows yet another embodiment of the optical switch 360. In this embodiment, the optical switch includes a linear grating portion 362 and a nonlinear grating portion 364. The linear grating portion 362 and the nonlinear grating portion 364 may have characteristics similar to those found in any of optical switches 84 and 142. In addition, the optical switch 360 may include a phase shift portion (not shown), and the linear grating portion 362, the nonlinear grating portion 364, and the phase shift portion (not shown) of the optical switch 360 may have characteristics such as those in any of optical switches 188, 234, 284, or 320. The optical switch 360 includes a substrate 366 which includes a gain medium 368. The optical switch 360 also includes a means (not shown) for exciting the gain medium 368, so that incident light is amplified by the gain medium 368. In other words, light which is reflected by the optical switch 360 is amplified, and light which is transmitted by the optical switch 360 is amplified. A graphic illustration 370 for the optical switch 360 of output power (transmission) as a function of input power shows the circumstances in which the optical switch 360 transmits light. Similarly, a graphic illustration 372 for the optical switch 360 of reflected power as a function of input power shows the circumstances in which the optical switch 360 reflects light.

It will be evident to those skilled in the art that the invention can take many forms, and the such forms are within the scope of the invention as claimed. Therefore, the spirit and scope of the appended claims should not be limited to the description of the preferred versions contained herein.

We claim:

1. An optical switch for operation by an incident light, the optical switch having:
   (a) a nonlinear grating portion including a plurality of periodically alternating layers of a negative nonlinear material having a first nonlinear refractive index and a positive nonlinear material having a second nonlinear refractive index when the incident light has a first intensity, the first nonlinear refractive index being higher than the second nonlinear refractive index, the nonlinear grating portion having a first average nonlinear refractive index when the incident light has the first intensity, the periodically alternating layers forming a first nonlinear grating portion sequence of alternating relatively higher and relatively lower refractive indices when the incident light has the first intensity, and the nonlinear grating portion having a nonlinear grating period;
   (b) a linear grating portion positioned adjacent to the nonlinear grating portion, the linear grating portion and the nonlinear grating portion meeting at an interface, the linear grating portion including a plurality of periodically alternating layers of a first linear material having a first linear refractive index and a second linear material having a second linear refractive index, the first linear refractive index being higher than the second linear refractive index, the periodically alternating layers comprising the linear grating portion forming a linear grating portion sequence of alternating relatively higher and relatively lower refractive indices, the linear grating portion having an average linear refractive index substantially equivalent to the first average nonlinear refractive index, and the linear grating portion having a linear grating portion period substantially equivalent to the nonlinear grating portion period;

(c) the nonlinear grating portion and the linear grating portion being positioned relative to each other such that the first nonlinear grating portion sequence and the linear grating portion sequence form a continuous sequence of alternating relatively higher and relatively lower refractive indices along the optical switch, and the incident light having the first intensity is substantially reflected;

(d) the negative nonlinear material having a third nonlinear refractive index and the positive nonlinear material having a fourth nonlinear refractive index when the incident light has a second intensity, the second intensity being substantially higher than the first intensity, and the fourth nonlinear refractive index being substantially higher than the third nonlinear refractive index, such that the periodically alternating layers comprising the nonlinear grating portion form a second nonlinear grating portion sequence of alternating relatively higher and relatively lower refractive indices when the incident light has the second intensity; and (e) the second nonlinear grating portion sequence and the linear grating portion sequence forming a continuous sequence of alternating relatively higher and relatively lower refractive indices along the optical switch, interrupted by a discontinuity at the interface of the linear grating portion and the nonlinear grating portion, such that, when the incident light has the second intensity, the nonlinear grating portion has a second average nonlinear refractive index which is substantially equivalent to the average linear refractive index, and light having a narrow band of frequencies is substantially transmitted, whereby, when the incident light has the first intensity, the incident light is substantially reflected by the optical switch, and when the incident light has the second intensity, light having a narrow band of frequencies is substantially transmitted by the optical switch.

2. An optical switch for operation by an incident light, the optical switch having:

(a) a nonlinear grating portion including a plurality of periodically alternating layers of a negative nonlinear material having a first nonlinear refractive index and a positive nonlinear material having a second nonlinear refractive index when the incident light has a first intensity, the first nonlinear refractive index being higher than the second nonlinear refractive index, the nonlinear grating portion having a first average nonlinear refractive index when the incident light has the first intensity, the periodically alternating layers forming a first nonlinear grating portion sequence of alternating relatively higher and relatively lower refractive indices, and the nonlinear grating portion having a nonlinear grating portion period;

(b) a linear grating portion including a plurality of periodically alternating layers of a first linear material having a first linear refractive index and a second linear material having a second linear refractive index, the first linear refractive index being higher than the second linear refractive index, the periodically alternating layers comprising the linear grating portion forming a linear grating portion sequence of alternating relatively higher and relatively lower refractive indices, and the linear grating portion having an average linear refractive index, the linear grating portion having a linear grating portion period substantially equivalent to the nonlinear grating portion period;

(c) a phase shift portion disposed between the nonlinear grating portion and the linear grating portion;

(d) the nonlinear grating portion and the linear grating portion being positioned relative to each other such that the first nonlinear grating portion sequence and the linear grating portion sequence form a continuous sequence of alternating relatively higher and relatively lower refractive indices along the optical switch, interrupted by a first discontinuity at the phase shift portion;

(e) the first average nonlinear refractive index being substantially equivalent to the average linear refractive index, such that when incident light has the first intensity, light having a first narrow band of frequencies is transmitted;

(f) the negative nonlinear material having a third nonlinear refractive index and the positive nonlinear material having a fourth nonlinear refractive index when the incident light has a second intensity, the second intensity being substantially higher than the first intensity, and the fourth nonlinear refractive index being substantially higher than the third nonlinear refractive index, such that the periodically alternating layers comprising the nonlinear grating portion form a second nonlinear grating portion sequence of alternating relatively higher and relatively lower refractive indices when the incident light has the second intensity; and (g) the second nonlinear grating portion sequence and the linear grating portion sequence forming a continuous sequence of alternating relatively higher and relatively lower refractive indices along the optical switch, interrupted by a second discontinuity at the phase shift portion, the second discontinuity differing substantially from the first discontinuity, such that, when the incident light has the second intensity, the nonlinear grating portion has a second average nonlinear refractive index which is substantially equivalent to the average linear refractive index, and light having at least one second narrow band of frequencies is transmitted by the optical switch, whereby, when the incident light has the first intensity, light having the first narrow band of frequencies is substantially transmitted by the optical switch, and when the incident light has the second intensity, light having the second narrow band of frequencies is substantially transmitted by the optical switch.

3. An optical switch for operation by an incident light, the optical switch having:

(a) a nonlinear grating portion including a plurality of periodically alternating layers of a first negative nonlinear material having a first nonlinear refractive index and a second negative nonlinear material having a second nonlinear refractive index when the incident light has a first intensity, the first nonlinear refractive index being higher than the second nonlinear refractive index, the nonlinear grating portion having a first average nonlinear refractive index when the incident light has the first intensity, the periodically alternating layers forming a first nonlinear grating portion sequence of alternating relatively higher and relatively lower refractive indices, and the nonlinear grating portion having a nonlinear grating portion period;

(b) a linear grating portion including a plurality of periodically alternating layers of a first linear material having a first linear refractive index and a second linear material having a second linear refractive index, the first linear refractive index being higher than the second linear refractive index, the periodically alternating layers comprising the linear grating portion forming a linear grating portion sequence of alternating relatively higher and relatively lower refractive indices, and the linear grating portion having an average linear refractive index, the linear grating portion having a linear grating portion period substantially equivalent to the nonlinear grating portion period;

(c) a phase shift portion disposed between the nonlinear grating portion and the linear grating portion;

(d) the nonlinear grating portion and the linear grating portion being positioned relative to each other such that the first nonlinear grating portion sequence and the linear grating portion sequence form a continuous sequence of alternating relatively higher and relatively lower refractive indices along the optical switch, interrupted by a discontinuity at the phase shift portion;

(e) the first average nonlinear refractive index differing substantially from the average linear refractive index when the incident light has the first intensity, such that incident light having the first intensity is substantially reflected;

(f) the first negative nonlinear material having a third nonlinear refractive index and the second negative nonlinear material having a fourth nonlinear refractive index when the incident light has a second intensity, the second intensity being substantially higher than the first intensity, and the fourth nonlinear refractive index being substantially higher than the third nonlinear refractive index, such that the periodically alternating layers comprising the nonlinear grating portion form a second nonlinear grating portion sequence of alternating relatively higher and relatively lower refractive indices when the incident light has the second intensity; and (g) the second nonlinear grating portion sequence and the linear grating portion sequence forming a continuous sequence of alternating relatively higher and relatively lower refractive indices along the optical switch, interrupted by the discontinuity at the phase shift portion, such that, when the incident light has the second intensity, the nonlinear grating portion has a second average nonlinear refractive index which is substantially equivalent to the average linear refractive index, and light having at least one narrow band of frequencies is substantially transmitted, whereby, when the incident light has the first intensity, the incident light is substantially reflected by the optical switch, and when the incident light has the second intensity, light having at least one narrow band of frequencies is substantially transmitted by the optical switch.

4. An optical switch for operation by an incident light, the optical switch having:

(a) a nonlinear grating portion including a plurality of periodically alternating layers of a first positive nonlinear material having a first nonlinear refractive index and a second positive nonlinear material having a second nonlinear refractive index when the incident light has a first intensity, the first nonlinear refractive index being higher than the second nonlinear refractive index, the nonlinear grating portion having a first average nonlinear refractive index when the incident light has the first intensity, the periodically alternating layers forming a first nonlinear grating portion sequence of alternating relatively higher and relatively lower refractive indices, and the nonlinear grating portion having a nonlinear grating portion period;

(b) a linear grating portion including a plurality of periodically alternating layers of a first linear material having a first linear refractive index and a second linear material having a second linear refractive index, the first linear refractive index being higher than the second linear refractive index, the periodically alternating layers comprising the linear grating portion forming a linear grating portion sequence of alternating relatively higher and relatively lower refractive indices, and the linear grating portion having an average linear refractive index, the linear grating portion having a linear grating portion period substantially equivalent to the nonlinear grating portion period;

(c) a phase shift portion disposed between the nonlinear grating portion and the linear grating portion;

(d) the nonlinear grating portion and the linear grating portion being positioned relative to each other such that the first nonlinear grating portion sequence and the linear grating portion sequence form a continuous sequence of alternating relatively higher and relatively lower refractive indices along the optical switch, interrupted by a discontinuity at the phase shift portion;

(e) the nonlinear grating portion having a first average nonlinear refractive index differing substantially from the average linear refractive index when the incident light has the first intensity, such that incident light having the first intensity is substantially reflected by the optical switch;

(f) the first positive nonlinear material having a third nonlinear refractive index and the second positive nonlinear material having a fourth nonlinear refractive index when the incident light has a second intensity, the second intensity being substantially higher than the first intensity, and the fourth nonlinear refractive index being substantially higher than the third nonlinear refractive index, such that the periodically alternating layers comprising the nonlinear grating portion form a second nonlinear grating portion sequence of alternating relatively higher and relatively lower refractive indices when the incident light has the second intensity; and (g) the second nonlinear grating portion sequence and the linear grating portion sequence forming a continuous sequence of alternating relatively higher and relatively lower refractive indices along the optical switch, interrupted by the discontinuity at the phase shift portion, such that, when the incident light has the second intensity, the nonlinear grating portion has a second average nonlinear refractive index which is substantially equivalent to the average linear refractive index, and light having at least one narrow band of frequencies is transmitted, whereby, when the incident light has the first intensity, the incident light is substantially reflected by the optical switch, and when the incident light has the second intensity, light having at least one narrow band of frequencies is substantially transmitted by the optical switch.

5. An optical switch for operation by an incident light, the optical switch having:
(a) a nonlinear grating portion including a plurality of periodically alternating layers of a first positive nonlinear material having a first nonlinear refractive index and a second positive nonlinear material having a second nonlinear refractive index when the incident light has a first intensity, the first nonlinear refractive index being higher than the second nonlinear refractive index, the nonlinear grating portion having a first average nonlinear refractive index $n_1$ when the incident light has the first intensity, the periodically alternating layers forming a first nonlinear grating portion sequence of alternating relatively higher and relatively lower refractive indices, and the nonlinear grating portion having a nonlinear grating portion period $P_2$;
(b) a linear grating portion including a plurality of periodically alternating layers of a first linear material having a first linear refractive index and a second linear material having a second linear refractive index, the first linear refractive index being higher than the second linear refractive index, the periodically alternating layers comprising the linear grating portion forming a linear grating portion sequence of alternating relatively higher and relatively lower refractive indices, and the linear grating portion having an average linear refractive index $n_0$, the linear grating portion having a linear grating portion period $P_1$ substantially greater than the nonlinear grating portion period $P_2$;
(c) a phase shift portion disposed between the nonlinear grating portion and the linear grating portion;
(d) the nonlinear grating portion and the linear grating portion being positioned relative to each other such that the first nonlinear grating portion sequence and the linear grating portion sequence form a continuous sequence of alternating relatively higher and relatively lower refractive indices along the optical switch, interrupted by a discontinuity at the phase shift portion;
(e) the first positive nonlinear material having a third nonlinear refractive index and the second positive nonlinear material having a fourth nonlinear refractive index when the incident light has a second intensity, the second intensity being substantially higher than the first intensity, and the fourth nonlinear refractive index being substantially higher than the third nonlinear refractive index, such that the periodically alternating layers comprising the nonlinear grating portion form a second nonlinear grating portion sequence of alternating relatively higher and relatively lower refractive indices when the incident light has the second intensity;
(f) the second nonlinear grating portion sequence and the linear grating portion sequence forming a continuous sequence of alternating relatively higher and relatively lower refractive indices along the optical switch, interrupted by the discontinuity at the phase shift portion;
(g) the nonlinear grating portion having a second average nonlinear grating refractive index $n_2$ when the incident light has the second intensity, such that the following equation:

$$2n_0P_1 = 2n_2P_2$$

is satisfied, and light having at least one narrow band of frequencies is transmitted; and (h) $2n_0P_1$ differing substantially from $2n_1P_2$, such that the incident light having the first intensity is substantially reflected, whereby, when the incident light has the first intensity, the incident light is substantially reflected by the optical switch, and when the incident light has the second intensity, light having at least one narrow band of frequencies is substantially transmitted by the optical switch.

6. An optical switch for operation by an incident light, the optical switch having:
(a) a nonlinear grating portion including a plurality of periodically alternating layers of a first negative nonlinear material having a first nonlinear refractive index and a second negative nonlinear material having a second nonlinear refractive index when the incident light has a first intensity, the first nonlinear refractive index being higher than the second nonlinear refractive index, the nonlinear grating portion having a first average refractive index $n_1$ when the incident light has the first intensity, the periodically alternating layers forming a fist nonlinear grating portion sequence of alternating relatively higher and relatively lower refractive indices, and the nonlinear grating portion having a nonlinear grating portion period $P_2$;
(b) a linear grating portion including a plurality of periodically alternating layers of a first linear material having a first linear refractive index and a second linear material having a second linear refractive index, the first linear refractive index being higher than the second linear refractive index, the periodically alternating layers comprising the linear grating portion forming a linear grating portion sequence of alternating relatively higher and relatively lower refractive indices, and the linear grating portion having an average linear refractive index $n_0$, the linear grating portion having a linear grating portion period $P_1$ substantially less than the nonlinear grating portion period $P_2$;
(c) a phase shift portion disposed between the nonlinear grating portion and the linear grating portion;
(d) the nonlinear grating portion and the linear grating portion being positioned relative to each other such that the first nonlinear grating portion sequence and the linear grating portion sequence form a continuous sequence of alternating relatively higher and relatively lower refractive indices along the optical switch, interrupted by a discontinuity at the phase shift portion;
(e) the first negative nonlinear material having a third nonlinear refractive index and the second negative nonlinear material having a fourth nonlinear refractive index when the incident light has a second intensity, the second intensity being substantially higher than the first intensity, and the fourth nonlinear refractive index being substantially higher than the third nonlinear refractive index, such that the periodically alternating layers comprising the nonlinear grating portion form a second nonlinear grating portion sequence of alternating relatively higher and relatively lower refractive indices when the incident light has the second intensity;
(f) the second nonlinear grating portion sequence and the linear grating portion sequence forming a continuous sequence of alternating relatively higher and relatively lower refractive indices along the optical switch, interrupted by the discontinuity of the phase shift portion;

(g) the nonlinear grating portion having a second average nonlinear refractive index $n_2$ when the incident light has the second intensity, such that the following equation:

$$2n_0P_1 = 2n_2P_2$$

is satisfied, and light having at least one narrow band of frequencies is substantially transmitted, and (h) $2n_0P_1$ differing substantially from $2n_1P_2$, such that the incident light having the first intensity is substantially reflected, whereby, when the incident light has the first intensity, the incident light is substantially reflected by the optical switch, and when the incident light has the second intensity, light having at least one narrow band of frequencies is substantially transmitted by the optical switch.

7. An optical switch as defined in any of claims 1–6 additionally including a gain medium for amplifying the incident light and a means for exciting the gain medium, such that when the incident light is supplied to the gain medium and the gain medium is excited, the gain medium amplifies the incident light.

* * * * *